United States Patent
Naqvi

(10) Patent No.: US 10,771,936 B2
(45) Date of Patent: Sep. 8, 2020

(54) SYSTEM AND METHOD OF CREATING ABSTRACTIONS OF REAL AND VIRTUAL ENVIRONMENTS AND OBJECTS SUBJECT TO LATENCY CONSTRAINTS

(71) Applicant: Sensoriant, Inc., Cedar Knolls, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 525 days.

(21) Appl. No.: 15/019,438

(22) Filed: Feb. 9, 2016

(65) Prior Publication Data
US 2016/0269857 A1 Sep. 15, 2016

Related U.S. Application Data

(63) Continuation-in-part of application No. 14/466,676, filed on Aug. 22, 2014.
(Continued)

(51) Int. Cl.
*H04W 4/38* (2018.01)
*G06F 16/22* (2019.01)
(Continued)

(52) U.S. Cl.
CPC .......... *H04W 4/38* (2018.02); *G06F 16/2272* (2019.01); *G06F 16/9537* (2019.01);
(Continued)

(58) Field of Classification Search
CPC . H04W 4/02; H04W 4/80; H04W 4/12; G06F 17/30336; G06F 17/3087; H06L 29/08; H04L 43/16
(Continued)

(56) References Cited

U.S. PATENT DOCUMENTS

| 7,013,149 B2 | 3/2006 | Vetro |
| 7,315,826 B1 | 1/2008 | Guheen et al. |

(Continued)

FOREIGN PATENT DOCUMENTS

| WO | 2011/161303 A1 | 12/2011 |
| WO | 2013187935 A1 | 12/2013 |

OTHER PUBLICATIONS

Eugeny Morozov, "To Save Everything, Click Here: The Folly of Technological Solutionism" Public Affairs, 2013, 6 pages.
(Continued)

*Primary Examiner* — Pierre M Vital
*Assistant Examiner* — Alicia M Antoine
(74) *Attorney, Agent, or Firm* — Stuart H. Mayer; Mayer & Williams PC

(57) ABSTRACT

System and methods are described to create successive abstractions of real and virtual environments and objects. A common framework is provided to define abstractions for a large collection of various input data feeds. It is assumed that environments are either instrumented to produce such messages or that they may contain sensors or smart devices that generate such messages. Incoming messages are analyzed preserving latency requirements and without imposing unduly heavy procedures. The analysis yields various abstractions at several scales that can be utilized by application programs. A system architecture using specialized storage mechanisms is proposed that preserves the latency requirements of the incoming data messages and the generated abstractions.

3 Claims, 16 Drawing Sheets

Related U.S. Application Data

(60) Provisional application No. 62/113,605, filed on Feb. 9, 2015, provisional application No. 61/868,707, filed on Aug. 22, 2013.

(51) Int. Cl.
*G06F 16/9537* (2019.01)
*H04L 29/08* (2006.01)
*H04W 4/80* (2018.01)
*H04L 12/26* (2006.01)
*H04W 4/12* (2009.01)

(52) U.S. Cl.
CPC .............. *H04L 29/08* (2013.01); *H04L 43/16* (2013.01); *H04L 67/04* (2013.01); *H04L 67/10* (2013.01); *H04L 67/12* (2013.01); *H04L 67/2809* (2013.01); *H04W 4/12* (2013.01); *H04W 4/80* (2018.02)

(58) Field of Classification Search
USPC ........................................................ 707/746
See application file for complete search history.

(56) References Cited

U.S. PATENT DOCUMENTS

| | | |
|---|---|---|
| 7,685,023 B1 | 3/2010 | Abraham |
| 7,702,760 B2 | 4/2010 | Latvakoski |
| 7,752,539 B2 | 7/2010 | Kopra |
| 7,810,153 B2 | 10/2010 | Perlin et al. |
| 7,994,981 B1 | 8/2011 | Farrokhi et al. |
| 8,826,013 B1 | 9/2014 | Kodukula |
| 8,831,994 B1 | 9/2014 | Hoffman |
| 9,063,811 B2 | 6/2015 | Stekkelpak |
| 2002/0160766 A1 | 10/2002 | Portman et al. |
| 2004/0073490 A1 | 4/2004 | Shah |
| 2004/0153548 A1 | 8/2004 | Latvakoski |
| 2004/0203851 A1 | 10/2004 | Vetro |
| 2005/0255839 A1 | 11/2005 | Perttila |
| 2006/0020483 A1 | 1/2006 | Hsu |
| 2006/0178918 A1 | 8/2006 | Mikurak |
| 2007/0010195 A1 | 1/2007 | Brown |
| 2007/0050820 A1 | 3/2007 | Saarikivi |
| 2007/0171921 A1 | 7/2007 | Wookey et al. |
| 2007/0198656 A1 | 8/2007 | Mazzaferri |
| 2008/0256054 A1 | 10/2008 | Saaty |
| 2009/0177603 A1 | 7/2009 | Honisch |
| 2009/0300635 A1 | 12/2009 | Ferris |
| 2010/0232405 A1 | 9/2010 | Kikuchi |
| 2011/0119351 A1 | 5/2011 | Tamura |
| 2011/0302153 A1 | 12/2011 | Meretakis |
| 2012/0084349 A1 | 4/2012 | Lee |
| 2012/0215755 A1 | 8/2012 | Kumar et al. |
| 2012/0265811 A1 | 10/2012 | Bist |
| 2012/0271548 A1 | 10/2012 | Koehler et al. |
| 2012/0284247 A1 | 11/2012 | Jiang |
| 2012/0284256 A1 | 11/2012 | Mahajan |
| 2012/0289788 A1* | 11/2012 | Jain ..................... G06F 19/3418 702/19 |
| 2012/0303412 A1 | 11/2012 | Etzioni |
| 2013/0024492 A1 | 1/2013 | Graff et al. |
| 2013/0159996 A1 | 6/2013 | Lin |
| 2013/0205243 A1 | 8/2013 | Rivera |
| 2013/0275230 A1 | 10/2013 | Sawyer et al. |
| 2013/0317950 A1 | 11/2013 | Abraham |
| 2014/0025540 A1 | 1/2014 | Hendrickson |
| 2014/0040226 A1 | 2/2014 | Sadhukha |
| 2014/0089243 A1* | 3/2014 | Oppenheimer ........ G06Q 10/08 706/46 |
| 2014/0129942 A1* | 5/2014 | Rathod .................. G06Q 50/01 715/720 |
| 2014/0142949 A1 | 5/2014 | Newman |
| 2014/0200991 A1 | 7/2014 | Wu |
| 2014/0250433 A1 | 9/2014 | Stekkelpak |
| 2014/0379273 A1* | 12/2014 | Petisce .................. G16H 50/20 702/19 |
| 2014/0379747 A1 | 12/2014 | Majumder |
| 2015/0127940 A1 | 5/2015 | Polehn et al. |
| 2015/0310020 A1* | 10/2015 | Brav ...................... G06F 40/20 707/730 |
| 2016/0270717 A1* | 9/2016 | Luna .................. G06F 19/3481 |
| 2016/0357794 A1 | 12/2016 | Liang |

OTHER PUBLICATIONS

Frost. James, "iBeacon in iOS 8 getting location based notifications, plus: FCC filing suggests Apple to launch own iBeacon hardware", published Sep. 2, 2014, retrieved from: http://www.macworld.co.uk/news/iosapps/apples-plans-for-ibeacon-hardware-new-ios-8-location-notifications-3542708/ (4 pages total).

Barrett, "Google's Going to Make Downloading Apps an Afterthought", Nov. 19, 2015, downloaded at http://www..vired.com/2015/11/google-streaming-apps-search/, 4 pages.

Hastie et al., "The Elements of Statistical Learning Data Mining, Inference, and Prediction", 32 pages. Second Edition, Springer, 2009.

Rich McCormick, "Android Instant Apps are now available for limited testing", dated Jan. 24, 2017, 2 pages.

Frederic Lardinois, "Google takes a new approach to native apps with Instant Apps for Android" May 19, 2016, 8 pages.

* cited by examiner

| RANGE | LABEL |
|---|---|
| [0, 1] | T(STATIONARY) |
| [2,5] | S(SLOW) |
| [6,10] | M(MEDIUM) |
| [11,15] | F(FAST) |

*FIG. 8A*

USER 1: SSSSTTMMMMMFFFSSMFMF...
USER 2: SSSMMMMFFFFFTTTTTTTT...
...

*FIG. 8B*

USER 1: SSSSTTMMMMMFFFSSMFMF...
USER 2: SSSMMMMFFFFFTTTTTTTT...

*FIG. 8C*

| PROCESS | DIRECTION-1 | DIRECTION-2 | MAGNITUDE-1 | MAGNITUDE-2 |
|---|---|---|---|---|
| P1, P2, P3 | [-π/6, π/6] | NORMAL | [-∞, 9] | LOW |
| P4, P5 | [π/6, π/3] | HIGH | [10, 19] | NORMAL |
| P6 | [π/3, ∞] | LOW | [20, ∞] | HIGH |

*FIG. 10A*

| ABSTRACTION | [-π/6, π/6] | [π/6, π/3] | [-∞, 9] | ... | NORMAL | MEDIUM | HIGH |
|---|---|---|---|---|---|---|---|
| DIRECTION-1 | Y | N | N |  | N/A | N/A | N/A |
| DIRECTION-2 | N/A | N/A | N |  | Y | N | N |
| MAGNITUDE-1 | N/A | N/A | Y |  | N/A | N/A | N/A |
| MAGNITUDE-2 | N/A | N/A | N/A |  | Y | N | N |
| CPU %AGE | N/A | N/A | N/A |  | N | Y | N |
| ... |  |  |  |  |  |  |  |

*FIG. 10B*

| WORD | FREQ |
|---|---|
| TIRED | 1 |
| QUICK | 1 |
| BROWN | 1 |
| FOX | 2 |
| JUMP | 4 |
| OVER | 1 |
| FENCE | 1 |
| MADE | 1 |

| WORD | DISTANCE |
|---|---|
| FOX | [4,16] |
| JUMP | [5,7,13] |

SYSTEM AND METHOD OF CREATING ABSTRACTIONS OF REAL AND VIRTUAL ENVIRONMENTS AND OBJECTS SUBJECT TO LATENCY CONSTRAINTS

CROSS-REFERENCE TO RELATED APPLICATIONS

This application is a Non-Provisional of Provisional Application No. 62/113,605, filed Feb. 9, 2015, entitled "MEDIATED REPRESENTATIONS OF REAL AND VIRTUAL SPACES". This application is also a continuation-in-part of U.S. application Ser. No. 14/466,676, filed Aug. 22, 2014, entitled "METHOD AND SYSTEM FOR ADDRESSING THE PROBLEM OF DISCOVERING RELEVANT SERVICES AND APPLICATIONS THAT ARE AVAILABLE OVER THE INTERNET OR OTHER COMMUNICATION NETWORK", which is a non-provisional of Provisional Application No. 61/868,707, filed Aug. 22, 2013, all of which are incorporated herein by reference in their entireties.

BACKGROUND

Various kinds of sensors or information-transmitting devices containing sensors (sometimes also called smart devices) continue to be installed in physical environments leading to a merger of the online and physical worlds. Mobile phones also contain several sensors that may provide data to applications installed on the mobile phone or to servers connected to the mobile phone via data networks. Software systems that create virtual environments are being instrumented to capture events in data sets (also called log files). Data sets of online and physical environments are being made available for computational purposes.

SUMMARY

In accordance with one aspect of the invention, a system and methods are provided whereby data from sensors in a physical environment or a physical object is selectively collected, processed and combined to produce one or more data records conforming to one or more pre-determined formats.

In accordance with one aspect of the invention, a system and methods are provided whereby data from instrumented pieces of software (acting as software sensors) in a virtual environment is selectively collected, processed and combined to produce one or more data records conforming to one or more pre-determined formats.

In accordance with one aspect of the invention, a system and methods are provided whereby data from virtual user identities existing or operating in a virtual environment is selectively collected, processed and combined to produce one or more data records conforming to one or more pre-determined formats.

In accordance with one aspect of the invention, a system and methods are provided whereby data from sensors contained in Internet Connected Devices (ICDs), or from ICDs that may be proximate to a mobile phone, or data from smart devices is selectively collected, processed and combined to produce data records conforming to a pre-determined format. Said data may be aggregated by intermediate devices at intermediate locations before being input to the system of the present invention.

In accordance with one aspect of the invention, event data from software systems logs generated by instrumented software systems is selectively collected, processed and combined to produce a set of data records conforming to a pre-determined format.

In accordance with one aspect of the invention, a set of data records is processed to derive one or more abstractions at one or more scales.

In accordance with one aspect of the invention, the scale underlying an abstraction may be provided by user commands, may be the result of computational procedures or rule sets, or the result of machine learning methods and systems.

In accordance with one aspect of the invention, a mobile device is a mobile phone, smart phone, Personal Digital Assistant, fitness bracelet, tablet, smart glasses, smart watch, wearable computer, a computer embedded within another device or attached to the human body, etc.

In accordance with one aspect of the invention, a device proximate to a mobile device is a device that has a wired or wireless connection to said mobile device. A non-exhaustive list of such exemplary devices comprises smart watches, smart glasses, fitness bands, etc.

In accordance with one aspect of the invention, producing abstraction(s) from a set of data records comprises changing the occurrence, existence or presentation order of objects in the data records using preferences related to one or more events, said preferences being stated by users or obtained via system policy or obtained by use of machine learning systems.

In accordance with one aspect of the invention, processing a set of data records (to produce one or more abstractions) comprises selectively processing one or more objects in the data set using sensed data of one or more users or events, rate of change of sensed data of one or more users or events, gradient of sensed data of one or more users or events.

In accordance with one aspect of the invention, deriving abstractions from a set of data records comprises inferring movements from data obtained from one or more sensors installed in a physical environment, or sensors installed within a physical device, or from sensors contained within or proximate to a mobile device.

In accordance with one aspect of the invention, sensors are categorized as physical or virtual sensors. Similarly, environments are categorized as physical or virtual environments.

In accordance with one aspect of the invention, one or more geometric spaces are associated with an environment containing ICDs, physical or virtual sensors.

In accordance with one aspect of the invention, the one or more geometric spaces are used to derive properties (abstractions) of said environment by using data emitted from sensors in said environment.

In accordance with one aspect of the invention, the abstractions (properties) derived from the data from sensors in an environment are used to further derive an abstraction called the signature of said environment. The signature derived for an environment may be used as indicative of normal operation (behavior) of said environment or objects within said environment. The designation of normative behavior of an environment from the signature of said environment may be based on human curation, learnt from software rule sets or software using machine learning.

In accordance with one aspect of the invention, the signatures are used as a part of a human-curation process involving humans and machines in which the signature object changes or is updated while said process is in operation.

In accordance with one aspect of the invention, one or more events in an environment may be captured as an abstraction by processing the input data from said environment and storing said abstraction. An application using said abstraction may verify the one or more events that are causal to said abstraction by making recourse to the underlying data. Said abstractions are then deemed to be verifiable. Said data that makes one or more abstractions verifiable may be made secure so as to allow only authorized access, e.g., by using cryptographic methods known in prior art.

In accordance with one aspect of the invention, the verifying of an abstraction may be accomplished by fully automatic means using application programs or by combining automatic verification with human-curated systems or workflows.

In accordance with one aspect of the invention, the combined automatic and human-curated systems may be used within one or more applications.

In accordance with one aspect of the invention, the combined automatic and human-curated system may be made available to applications through an Application Programming Interface (API) or a System Development Kit (SDK).

In accordance with one aspect of the invention, derived abstraction data is correlated with proximity to other items and events in one or more data sets.

In accordance with one aspect of the invention, derived abstractions may be presented using graphical, mathematical, and tabular forms or as visual objects.

In accordance with one aspect of the invention, a device in an environment may be issued commands, said commands obtained from a command and control API from an external resource, inference of said command based on use of abstractions derived from data from the environment where said device is located. Said commands may be issued by users, human-curated systems, or by software logic-based procedures. Said command may be communicated via network links connecting the device on which the mediated representation is rendered and the said object in said environment. Said external resource may be a Directory Server.

In accordance with one aspect of the invention, the Directory Server is accessed through fixed and/or wireless network connections.

In accordance with one aspect of the invention, the Directory Server is logically contained in the system described in the present invention and is accessed by using internal system links.

In accordance with one aspect of the invention, the Directory Server contains control API as data elements that can be retrieved via query languages.

In accordance with one aspect of the invention, the Directory Server contains control APIs for one or more devices, said devices may be installed in one or more environments.

In accordance with one aspect of the invention, the Directory Server receives control APIs for one or more devices by a pull mechanism wherein Directory Server interrogates a network resource to acquire said control APIs.

In accordance with one aspect of the invention, the control APIs are pushed to a Directory Server by devices or by a network resource.

In accordance with one aspect of the invention, one or more abstractions are stored in a storage system utilizing a broker system.

In accordance with one aspect of the invention, the address space of the broker system is defined by a torus data structure.

In accordance with one aspect of the invention, a torus data structure provides guaranteed access time to retrieval and storage requests despite the data being stored in subsystems of external storage systems that have varying response times.

In accordance with one aspect of the invention, the broker system uses a method of creating partitions, each partition being controlled by a manager process.

In accordance with one aspect of the invention, the broker system does load balancing of the data items in the partitions of a torus address space.

In accordance with one aspect of the invention, the broker system maintains consistency of data in case of failure of a partition manager by enlarging the size of its neighboring partitions.

In accordance with one aspect of the invention, the broker system retrieves all data items in a partition of a torus address space as a response to a query for a single data item stored in said torus address space.

In accordance with one aspect of the invention, the broker system uses a two-level approach when utilizing storage and retrieval requests.

In accordance with one aspect of the invention, the broker system stores references to externally stored items in its torus address space.

In accordance with one aspect of the invention, the calculation of the timer interval comprises methods to determine the number, type and capacity of the computing resources available, and the availability of type and capacity of communication links.

BRIEF DESCRIPTION OF DRAWINGS

FIGS. 8A, 8B and 8C show the storing of data at different scales.

FIG. 10A shows storing abstractions at different scales.

FIG. 10B illustrates a signature of abstractions.

DETAILED DESCRIPTION

Figure 1:
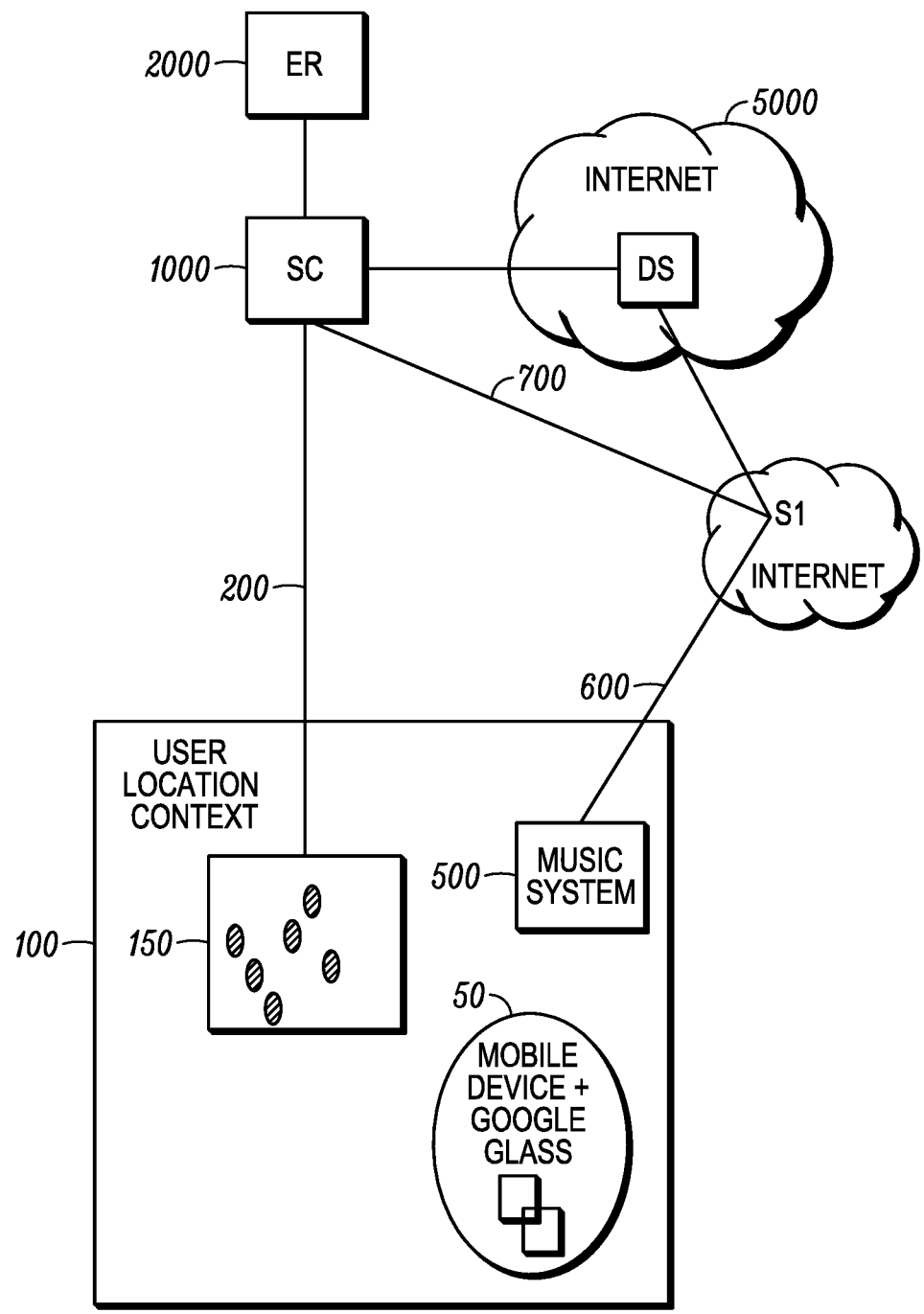
FIG. 1 depicts an exemplary embodiment.

The following descriptions are made with respect to the various figures included in the application and may refer to specific examples in said drawings; however, it is to be noted that such specific cases do not limit the generality of the various aspects of the invention whose scope is determined by the claims herein.

Software is being embedded into many physical devices. Sometimes such devices are called "smart devices" since they connect to the Internet through wireless, wired or Wi-Fi connections, i.e., to servers in a cloud-based system, where applications may be used to process the data being sent by the embedded software. Examples of such smart devices include thermostats installed in households that control the temperature settings in a house. Smart thermostats send data about a home's temperature settings to servers where the data may be analyzed to derive preferred temperature settings of individual residents of the house. A smart phone may "pair" with a smart thermostat and help in the identification of individuals and provide further data about individuals.

Physical sensors and software-based sensors are also being installed in physical devices that are used in manufacturing and industrial applications, e.g., robotic machines used in production and industrial systems often use many embedded sensors whose data is collected and transmitted for monitoring. The said collection and transmission of data may be done using intermediate computing devices.

Smart phones are another type of smart device that contain one or more sensors that may provide location, position, proximity, altitude, barometric pressure, etc., to cloud-based servers and/or applications. It should be noted that all references herein to smart phones apply more generally to a wide range of mobile communication devices and are not limited specifically to smart phones. Examples of such mobile communications devices include tablets, laptop computers, notebook computers and the like.

Recently, Apple, Inc. has published a specification for Bluetooth Low Energy (BLE) devices that may be installed in physical locations such as retail stores. BLE devices transmit data periodically using Bluetooth technology. These transmissions may be received by smart phones when they are in range of the Bluetooth signal. Upon reception, the smart phone operating system (OS) makes certain applications aware of the received signal who may then process it locally or send it on to cloud-based servers. BLE devices are sometimes collectively referred to as beacons. Of course, such beacons may communicate over other Bluetooth-based protocols and are not limited to those conforming to the Apple, Inc. specification. Moreover, such beacons may even employ alternative short-range wireless communication standards other than Bluetooth as well. A typical use of such devices is to trigger certain applications resident on a smart phone that may then identify the user and offer him, by way of example, coupons or advertisements pertinent to his current location, proximity to other items, etc.

Gimbal, Inc. produces another type of location-sensing signal-generating device that broadcasts messages using short-range radio signals. Gimbal messages may be received by proximate smart phones; said messages contain received signal strength indicators that may be used to determine the distance of the receiving device from the transmitting device. By triangulating information received from several messages, one may obtain the position of the receiving device. Estimote, Inc. is another producer of similar location-sensing signal-generating devices and with similar functions and usages.

The techniques of the present invention apply to all such devices and are not to be taken as being specifically applicable to any one such device. All such devices including, but not restricted to, sensors, software-based sensors, smart phones, BLE devices, indoor GPS, GPS, wi-fi systems, etc., are considered to belong to a category that may be described as location-sensing signal-generating devices, and may be collectively referred to as Internet Connected Devices (ICD). When an ICD senses location/position specifically we may refer to it as a location-sensing ICD.

Recently, wearable devices have been introduced that contain sensors that provide temperature, blood pressure, pulse and other related data pertaining to the well-being of the wearer. The wearable accessory, e.g., smart watch, typically "pairs" with a smart phone and uses such a connection to send wellness data of the wearer to an application on the smart phone, from whence it may be communicated to cloud-based systems or processes locally on the smart phone itself. The combination of the wearable device (s) and the smart phone, therefore, comprises an ICD.

The current press is replete with reports and stories about smart cars and other vehicles that "drive" themselves. It is expected that such automobiles will contain many ICDs that may be used to manage functions in the vehicle, provide services to passengers, drive the vehicle, maintain it, provide data on the components of the vehicle to cloud-based servers where it may get analyzed, etc.

In summary ICDs are being used or installed in various physical environments where they provide data on said environments that can be analyzed to manage these environments, provide services to people in said environments and to control certain attributes of the environment (e.g., temperature, background music, etc.).

ICDs are also being installed in physical devices to automate some or all of their functionality and, in the process, enhance their usability while offering more personalized services to the user.

As mentioned, sensors embedded within a physical environment or a physical device generate data that may be received in a cloud-based system of servers. It is expected that there will be many such devices and environments. Moreover, many different types of sensors will be used that will send multiple types of data.

It will be of commercial benefit to find commonality amongst all the data feeds that emanate from sensors and encapsulate it into a common library where it may be provided to applications. In other words, we can attempt to find a manageable number of abstractions of sensor data that can be used by application programs.

In some case the abstractions that are obtained from the data may be thought of as representing a change in some information parameter with respect to some other parameter. For instance, by way of illustration, in one simple example, the information parameter may be the location of a user's smartphone and the other parameter may be time, in which case the abstraction may be the change in the user's location over time. In other words, the abstraction may be the user's speed (magnitude) or velocity (magnitude and direction). Additional examples of abstractions that conform to this definition will be presented below. For now, it should be noted that an abstraction conforming to this definition is not limited to simply the changes in some information parameter, but also the change in the change of that parameter. That is, the abstraction may be any order derivative of the information parameter, or even an integral of the information parameter.

It should be further noted that in some particular applications to which the methods, techniques and systems described herein may be applied, other forms of abstractions may be obtained from the data. That is, the above definition of an abstraction as being a change in some information parameter with respect to some other parameter may not be applicable.

Such a common set of abstractions may speed up application development. In some cases, it may allow new applications to be crafted that provide more advanced services to users or solve hard problems in manufacturing, maintenance or production environments.

Exemplary Scenarios

As explained in more detail below, systems, arrangements and methods are described herein which can be used in a wide variety of different scenarios. A few such scenarios will now be presented for illustrative purposes. For example, in one scenario a retail store offers shopping services to its customers. In order to create an amiable ambience in the store it wants to provide background music that will be to the liking of its most frequent customers. Frequency of customers is to be determined by calculating the number of visits to the store per week by a customer. To that purpose the store installs a background music playing ICD. In FIG. 1 the music system is shown as (500) in the physical environment of its store (100). The music system 500 is connected to the Internet and a service provider S1 provides a music service for said music system. The service provider S1 may use a communication link 600 that is wireless in whole or in part to instruct the music player to render a particular audio/video stream that may either originate from "S1" or from local resources of 500.

What playlist should the service provider S1 be asked to play on device 500 that would be liked by its most frequent customers within the store at a given time as possible?

One way to solve this problem is as follows. If a substantial fraction of people always carries their smart phones with them, we may assume that a large number of people in the store at any given moment will be carrying their smart phones.

As noted earlier, smart phones are an example of an ICD (150, FIG. 1) that, when in the environment 100, uses its resident applications to send location/position data and other data to applications running in a cloud system represented in FIG. 1 by Server Complex (SC) 1000. An example of other data that may be communicated to SC 1000 (FIG. 1) is user identification information. (Typically, when a user downloads an application, he may be asked to provide email addresses and other such identifying information that may be used later by applications to identify said customer. Techniques that deduce identity of customers from user data are known as identity management and are widely practiced in prior art.) SC 1000 (FIG. 1) may thus know the user identities of the customers in the store at a given moment and will be able to calculate the most frequent customers based on past visit data. This information may be updated periodically as new position data is received from the environment by the SC 1000. The SC 1000 may then consult external resources, provide them the list of frequent user identities and request a playlist that satisfies the criteria of being liked by said customers. Examples of external resources that today store people's musical preferences and suggest playlists to their users are Pandora, Spotify, etc.

Continuing with the exemplary embodiment, FIG. 1 shows ICDs 150 installed inside the retail environment 100 whose locations are being transmitted as User Location Context Data 150 to SC 1000 via wireless link 200. SC 1000 receives the transmitted data and derives a user identities list from said data. (As mentioned above, SC 1000 may use an external Identity Management system to achieve this functionality.) SC 1000 then requests an external resource (ER) 2000 to provide it a playlist as per the above stated requirements. FIG. 1 also shows a particular user 50 in the environment 100 carrying a smart phone and a Google Glass device that are acting as an ICD.

Once the playlist has been received by the SC 1000, it must be sent to the service provider S1 with a request to implement the playlist on the device 500. It is to be noted that, in general, SC 1000 may not be aware of the address of S1.

One way of solving this problem is to assume that device 500 broadcasts its identity (e.g., a unique serial number) periodically using a Discovery protocol. Such discovery protocols are in common use in prior art, e.g., Microsoft's UPnP, Jinni from Oracle, open source SSDP, etc. Some discovery protocols use Bluetooth technology over short range radio signals. These identity containing broadcasts may be received by applications running on the smart phones in the retail store (e.g., 50 in FIG. 1) and the identity of said device (500) can be looked up by an application on the smart phone. Alternatively, the serial number information may be transmitted to the SC 1000 (along with other information as stated above) and the SC 1000 may consult a Directory Server 5000 to provide the address of the service provider for said device associated with said identifier. It is assumed that the identifier number uniquely identifies the device and its associated service provider. For example, Wolfram, Inc. has announced the construction of such a Directory Server that will hold identifying information of smart devices and their service providers and manufacturers. The SC 1000 may then instruct S1 using communication link 700.

As a second exemplary scenario, consider a retail store that wishes to determine the areas in the store that see the most traffic over a given time period, say 30 minutes. Moreover, they also wish to see the locations of the customers in the store at a given moment. (The input position data from the store environment may have a minimum arrival rate (latency), say 1 minute. In such cases the instantaneous locations of customers within the store may only be resolved to a scale of 1 minute. This aspect is discussed in more detail later.)

Figure 2:
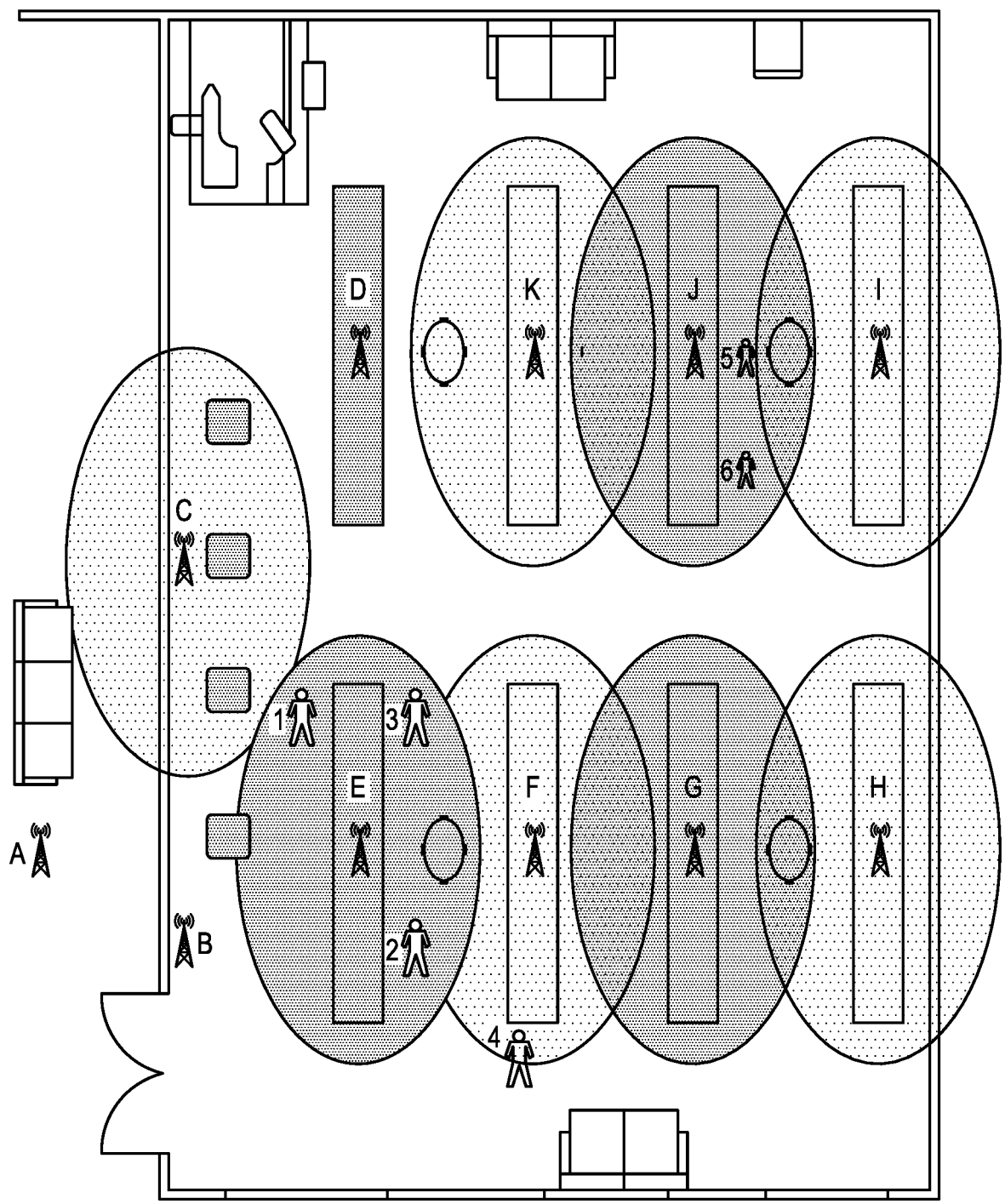
FIG. 2 shows a second exemplary embodiment.

In order to effectuate the required service, we may again assume that people in the store carry smart phones that may run applications that periodically transmit their locations to SC 1000 (FIG. 1). FIG. 2 shows an example of the layout of such a store. In one implementation the layout may be obtained by the SC 1000 as a planogram, which is a protocol used by retail establishments and others, which describes the layout and contents of a store. As shown in FIG. 2, ICDs, labeled A through K, have been installed in the environment of the store. The SC 1000 receives the location information from the smart phones and may integrate the location information over time and overlay this information on the layout shown in FIG. 2. The location information is illustrated in FIG. 2 by the shaded regions, which represent regions of higher concentration of customers. The instantaneous positions of the smart phones (and hence the customers) also may be displayed on the layout, in this example as stick figures, FIGS. 1-6. Finally, the two views may be super-imposed on the layout (e.g., planogram) of the retail store. FIG. 2 shows all three such renderings—the layout itself, the concentration of customers at different locations and the location of individual customers.

A third exemplary scenario may be described as follows. The retail establishment provides a downloadable application to its customers. When the application is launched by a customer (such as customer 50 in FIG. 1) using his smart phone, said application sends the smart phone's location to SC 1000. The SC 1000, using Planogram data, determines the contents of the store that are proximate to said location of the smart phone. SC 1000 (or another entity) determines an offer and transmits said offer back to the downloaded application running on the smart phone 50 in the environment 100. Said application displays the offer on said smart phone's display while the customer is standing in close proximity to said item.

Thus, as the above scenarios illustrate, it may be seen that a suitably designed SC 1000, acting upon data received from smart phones in particular, and ICDs in general, may offer a variety of services to customers and enterprises.

Main Modules of Server Complex (SC)

We now describe the internal workings of one particular example of the Server Complex 1000 of FIG. 1. In this example the SC 1000 is based on a pipeline architecture, also sometimes referred to as a "Lambda Architecture." The word "complex" generally refers to a cluster of servers.

Figure 3:
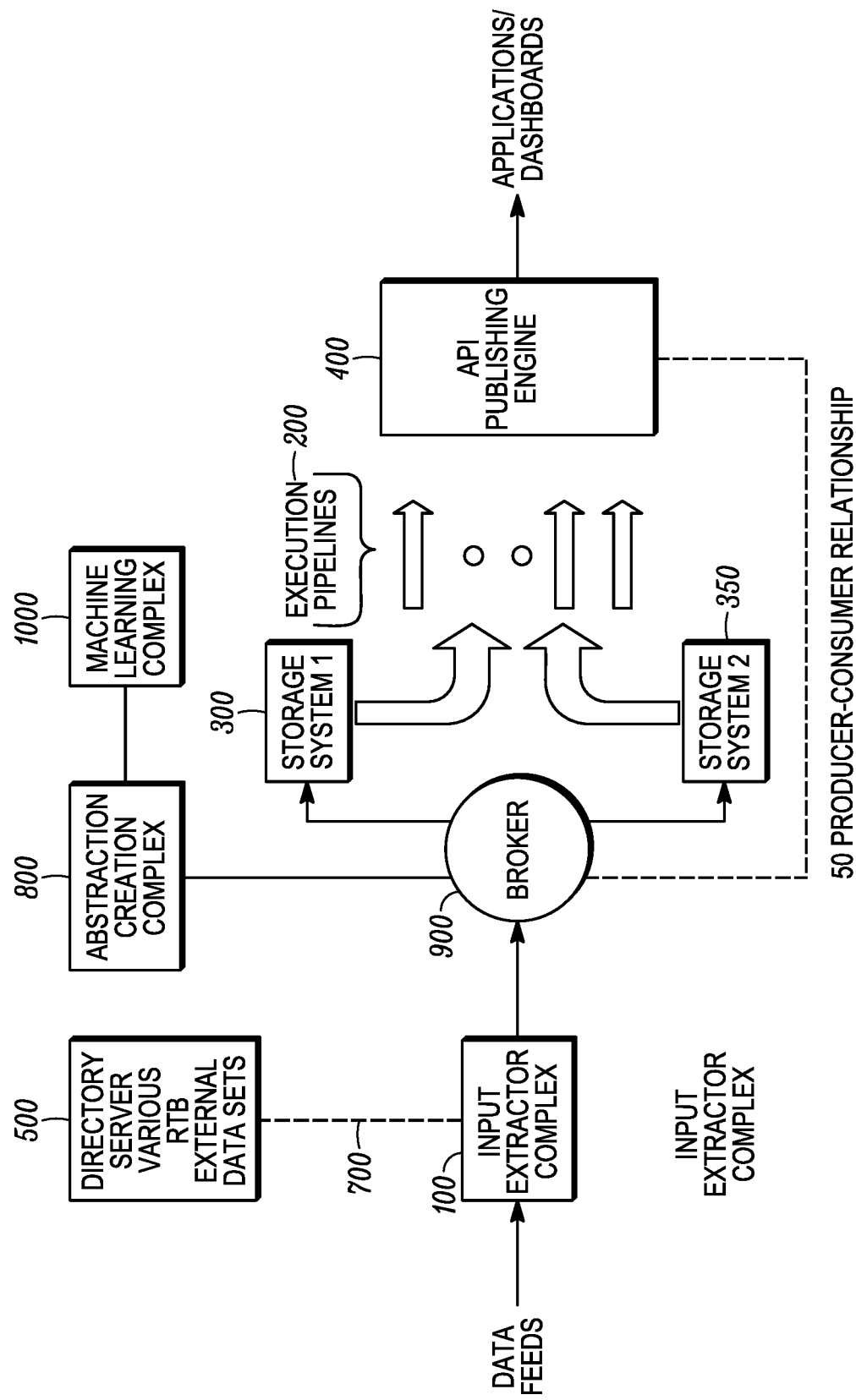
FIG. 3 shows the main components of the Server Complex (SC).

In FIG. 3, SC 1000 is shown to comprise of a cluster of components, which in some implementations are individual servers, viz., the Input Extractor Complex 100, the Execution Pipelines complex 200, the Storage System complex 300 & 350, Broker 900, the Abstraction Creation Complex 800, Machine Learning (ML) Complex 1000, and the API Publishing Engine Complex 400. The solid arrows depict the logical flow of data through the components comprising the SC 1000. The dashed line 50 represents a certain relationship between the PE 400 and the Broker 900 and will be described later. The dashed line connecting Directory Server 500 and the Input Extractor Complex 100 indicates that data sets may flow to IEC 100 from a variety of external systems; the dashed line thus represents many types of file system, server-based and real-time interfaces.

Input Extractor Complex (IEC)

In the IEC 100 the different formats of various incoming data feeds are converted into a preferred data record format described below. It is envisaged that the input data feeds will be made available from a variety of sources such as sensors, websites, computer programs, physical devices containing sensors, physical environments where sensors, BLE devices, (generally speaking, ICDs) have been installed, etc. In particular, various APIs may be provided that need to be used by the IEC to obtain the data. The input data feeds may be provided by a "pull" or a "push" mechanism, or by client-side or "server-side" API mechanisms, REST interfaces, etc. Additionally, batch oriented data sets or file systems may be specified as input. A large number of methods exist in prior art to convert the various formats of the input data feeds to a common desired format.

Broker & Storage System

The workings of the Broker (900) may be divided into two main categories.

First, the Broker accepts incoming data records from the Input Extractor Complex (IEC) 100 that have been suitably transformed by the IEC from the input data feeds.

Second, the Broker 900 distributes the input records to various storage systems, two of which are illustrated in FIG. 3 as storage systems 300 and 350. While only two storage systems are shown in FIG. 3, more generally the SC 1000 may include any number of storage systems. The Broker 900 distributes the input records by using procedures that are cognizant of the latency requirements of various applications that may use these records. Some applications may be more compute-intensive than others and may introduce latency into the system. Such latency considerations are of vital concern in the proposed pipelined (lambda-architected) system.

Various storage systems have varying degrees of latency in their operations, e.g., different query response time, transaction processing times, time to compute various data operations, etc. The present invention envisages using a variety of storage systems that present a number of choices that may be utilized by the Broker 900 for intelligent distribution of incoming data records to suitable storage system technologies.

Execution Pipelines

Once the various kinds of input data records have been stored in the storage systems they can be used by computer programs (e.g., applications). The system may maintain a number of programs that can use the stored data records. A particular program may request the Broker 900 for data. The Broker may then access a particular storage component, e.g., Storage System1 (300) or Storage System2 (350), to retrieve and provide the needed records. In some cases, the Broker 900 may provide multiple instances of a record, each instance supporting varying degrees of latency (explained later). The requested data records and the program are packaged and the resulting package is assigned to one or more execution pipelines.

An execution pipeline is a logical process that contains data with a known latency. Assume a program uses multiple data records that may be divided into three categories in terms of their latency. In this case three execution lines may be created and the package is assigned to all three execution lines. The underlying latency of the data records can provide faster executions if the program is written in a way that does not interleave different types of data records, i.e., data records are not mixed and matched in terms of their latency.

Abstraction Creation Complex (800)

Once the Broker 900 has stored the data records in the storage systems a set of computer programs resident in the Abstraction Creation Complex 800 may access the data records.

In practice the storing by the Broker and the accessing by computer programs in the Abstraction Creation Complex may be interleaved to reduce the latency that may get introduced due to storing processes. It is to be observed that various latencies are involved in the processes described so far.

Consider an environment with sensors, said sensors sending data to the IEC 100 of FIG. 3, either directly or indirectly via intermediate server(s). The sensors may be operating synchronously or asynchronously, in which case they may be triggered by an event. In either case, data from the sensors takes a certain amount of time (bounded below by the speed of electromagnetic transmission) to arrive at the IEC 100 (FIG. 3). We may refer to this as the arrival time or arrival latency. It is to be noted that the arrival latency can not be eliminated entirely because of the finite speed of light.

Once the data from an environment arrives at the IEC 100 (FIG. 3) it is converted into a preferred data record format and stored by the Broker. This processing takes a certain amount of time, or equivalently it adds a further latency to the system. The latter may be referred to as the processing delay or processing latency. The processing latency may be improved by using more compute power, more memory, or more efficient data storing and accessing procedures, etc. Again, there is a limit beyond which improvements can not be made due to the finite speed of processing.

Thus, it may be observed that an application wishing to use an abstraction derived from input data feeds must be cognizant of the arrival and processing latencies introduced into the system as described above. A "snapshot" of an environment produced by any application will be subject to said latencies. It may be said that the system of this invention has a basic "temporal ignorance" of the reality of the environment from which data is being received at any given moment.

Equivalently, we observe that the system of this invention operates subject to an input arrival rate and an input data (feed) processing rate, both rates having maximum values that can not be improved beyond certain values because of the physics of transmission systems and/or computational limitations.

While the working of computer programs in the Abstraction Creation Complex 800 FIG. 3 will be discussed in detail later, it may suffice to mention here that said programs operate on the stored data records, derive additional data and information from said data records, and store the newly derived data and information (called abstractions or properties) back into the storage systems (requesting the Broker 900 to satisfy said storage request). Thus, the various storage systems controlled by the Broker 900 do not only contain input data records transformed by the IEC 100 and subsequently stored by Broker 900 but they also contain additional data derived from the stored data records, said derivations being done by said computer programs residing in the Abstraction Creation Complex 800.

As previously mentioned, in some cases the abstractions that are generated by the Abstraction Creation Process 800 may be thought of as representing a change in some information parameter with respect to some other parameter. The parameters that are used in the abstractions will be application specific but may be in general any suitable set of parameters including but not limited to physical parameters such as location, size, volume, time, weight, temperature, pressure, intensity and so forth. For instance, in a manufacturing application a suitable abstraction may represent a change in pressure as a function of volume or temperature or as a function of both volume and temperature. As another example, in a health monitoring application the information parameters may include heart rate, blood pressure, body temperature and the degree of exertion. The information parameters may also be non-physical parameters that represent various aspects of virtual environments. For example, an example will be presented below in which the environment from which data is obtained is the execution space of a software system. In this case the information parameters may be function calls or other processes that are performed by various software modules. The abstractions that are generated may represent changes in these parameters with respect to another parameter such as time, memory utilization, CPU utilization and so on.

Publishing Engine Complex

The Publishing Engine Complex (PE) 400 (FIG. 3) may be used by applications to publish and/or provide its output to downstream client applications/devices.

The PE implements the "consumer" part of a "Producer-consumer" model (depicted as 50 in FIG. 3) with the Broker 900 (FIG. 3) as the producer. In this embodiment of the SC 1000, significant emphasis is placed on preserving the latency of the input data and having light-weight processes (among other mechanisms) act upon the input data. The output generated from the data are stored and retrieved by systems and processes that are cognizant of the latencies. In the same spirit the PE 400 uses a near real-time process that applications may utilize to provide their results to downstream clients.

Generally, the PE 400 may be used by applications to present data to clients. Moreover, the applications may produce successive versions of its outputs. The PE operates on a schedule maintained by a clock (described below). At this moment the clock may be thought of as being set to a pre-determined but configurable timer.

As an example, consider an application running on the Execution Pipelines 200 (FIG. 3) producing successive outputs with the help of the Broker 900 (FIG. 3). It requests the PE 400 to consume said data. The application may also request a rate at which the output must be consumed. The PE consumes the produced output at the requested rate and makes it available to downstream clients.

As an example consider an application running on a user's Google Glass device. In the exemplary embodiment of FIG. 1 the environment 100 contains ICDs providing the user location context data 150. The environment 100 also contains a user's Google Glass device and the associated smart phone 50. An application is running on the Google Glass device while the user is in the said environment (of the retail store) and the application displays (on the Google Glass display) information pertaining to some (but not all) of the store's items in the user's vicinity. (The Glass application may choose items to display by recourse to the user's past purchase history.) Since the user changes his location frequently, the display needs to be refreshed often. The Google Glass device (or the smart phone associated with the Glass device) 50 provides updated user location to the SC 1000 (FIG. 1) that produces updated versions of the item information. This updated information is made available by PE 400 (FIG. 3) to the Google Glass application periodically that displays it accordingly.

Figure 4:
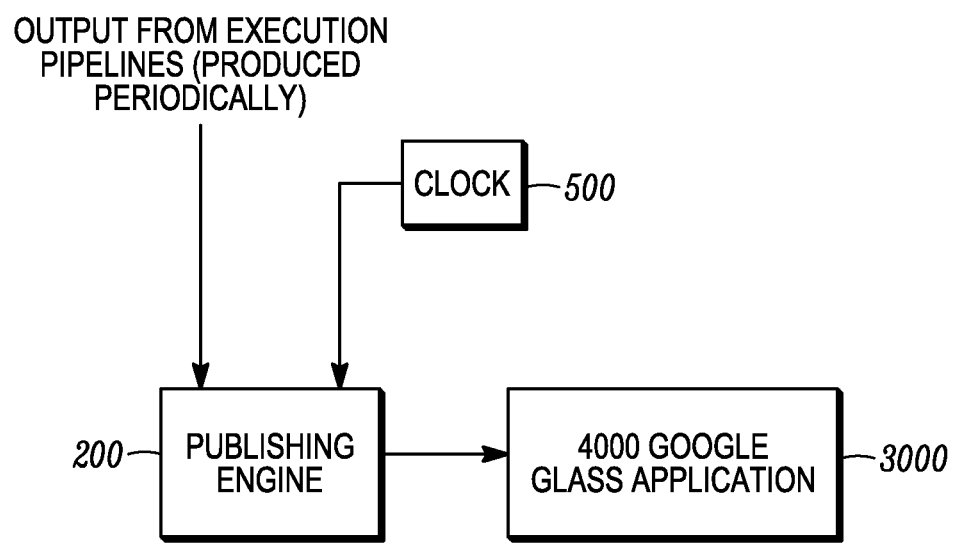
FIG. 4 shows an exemplary embodiment of the periodic publishing regimen of the Publishing Engine.

FIG. 4 depicts the above exemplary case of the PE's periodic publishing regimen. An application running on the Execution Pipelines produces successive outputs at a rate governed by a Clock 500. The PE 200 with respect to the clock rate accepts new outputs and forwards them to the application running on Google Glass 3000.

Machine Learning (ML) Complex 1000

The Machine Learning (ML) Complex 1000 in FIG. 3 is described later.

Position Input Data Feeds

We now turn our attention to the position, location and other data that is received by the SC 1000 of FIG. 1. Said data may originate, as described in previous exemplary embodiments, from physical environments, or from physical devices.

Position and location data may originate from smart phones of users. Many smart phones contain GPS receivers that use the Geo-Positioning Satellite System data (and often other terrestrial data sets) to compute the location of a smart phone at a given time and make such information available to applications resident on said smartphone. Said applications may then wirelessly transmit said location/position data to SC 1000.

Another manner in which SC 1000 (FIG. 1) may acquire user location/position data is via ICDs such as Gimbals, Estimote beacons, etc., GPS receivers, wi-fi routers, Indoor GPS systems, etc. Such devices generate signals periodically using a short-range radio protocol, e.g., Bluetooth or wi-fi. In one embodiment, said signals are received by the OS of smart phones within the reception area of said device signals, provided one or more applications have previously registered for receipt of said signals. The applications that registered for a signal are made aware of said signal when it is received by the OS of the smart phone. Once an application receives a broadcast signal, it may process the data in the signal or transmit it to SC 1000 (FIG. 1) where multiple incoming signals may be triangulated to determine the location of the smart phone that received said signals. The art of triangulation to determine position is well-known.

The utility of location/position data was highlighted by the several exemplary scenarios discussed earlier. However, position/location data may be mined for patterns that may be even more useful.

With respect to location/position data extracted from data received from ICDs, one such pattern may be referred to as "linger time" wherein a user is located for a certain length of time in the same location, or the location may be confined to a (small demarcated or defined) area. In particular, we observe that linger-time events may be significant when they occur in close proximity to certain defined and known locations or items. The identification of such events can have commercial benefit. For example, a customer lingering by a retail item may be interested in purchasing said item. The patterns that emerge from mining data are a type of "abstraction."

The input data feed from ICDs may be of the following form.

[ID1, ID2, . . . , IDn, Registration Time, Data, Reference, . . . ]

Thus, the input comprises a series of records; each record contains one or more identifying attributes, time attribute(s), data attribute(s), etc.

Linger Time Computation (Low Latency Method)

Figure 5:
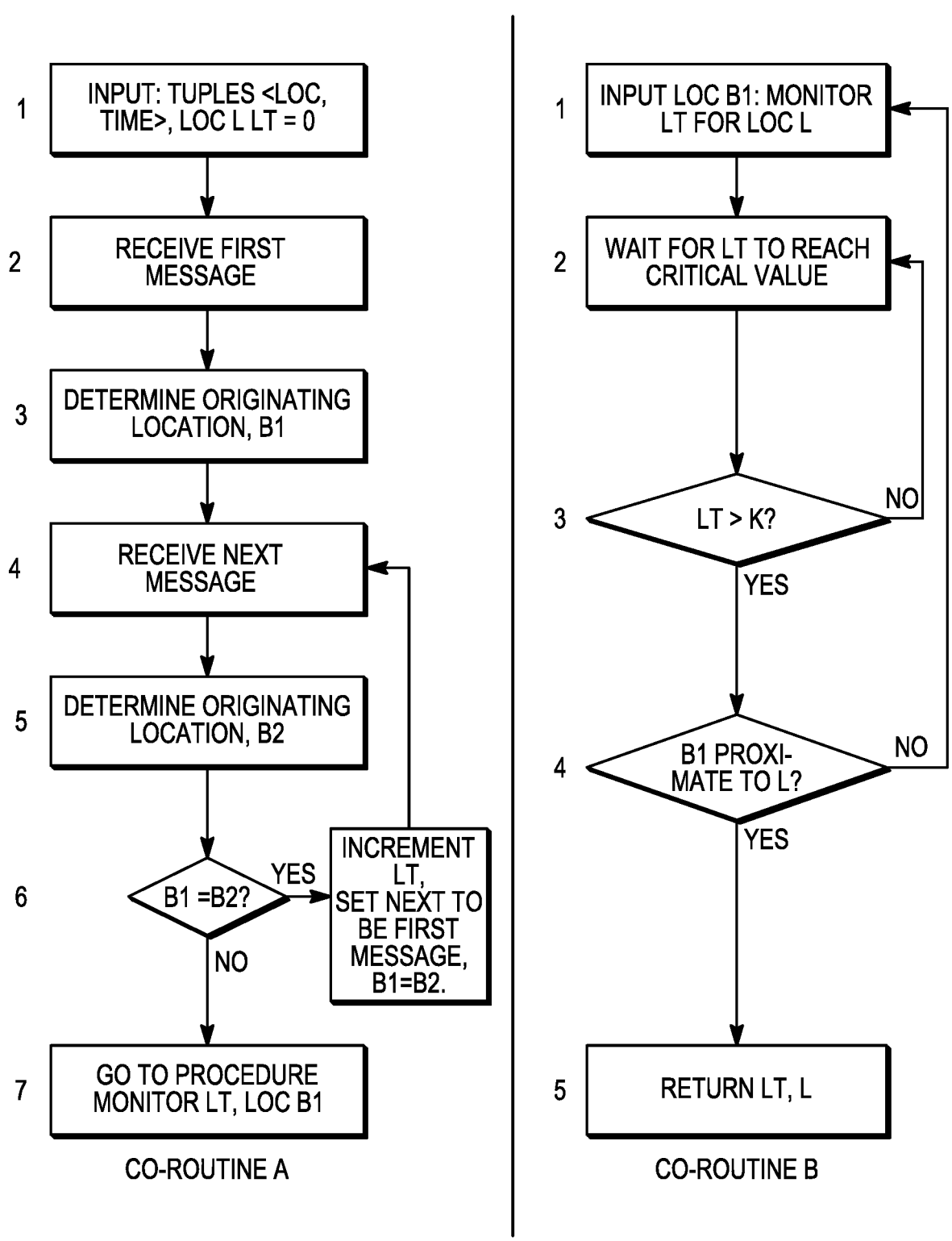
FIG. 5 shows methods for determining "linger-time" abstractions.

FIG. 5 shows a method to estimate the "linger time" proximate to a given location. Consider a retail store that displays its wares on shelves lining the aisles of the store. A customer who lingers in close proximity to an item's location may be interested in said item. Thus, the customer's physical act of "lingering" may be commercially important information for the managers of the retail store. In general, said store management might highlight several such locations in the store and it may want to be notified when a customer lingers by such a location.

FIG. 5 shows two co-routines A and B implementing the methods to determine linger-time events for a given location. In one implementation the co-routines may be executed by the abstraction creation complex 800 of the SC 1000 shown in FIG. 3.

Co-Routine A:

In step 1, the method is given as input a stream of input tuples containing location, and time, and one or more preferred locations "L," any of which may be, for example, in the vicinity of an item for sale that a retailer wants to monitor for consumer interest. A counter LT is set to zero.

In step 2 a first message is received from the environment.

In step 3 a determination is made of the location of the received first message, say B1.

In step 4 a next message is received.

In step 5 a determination is made of the location of the "next" message, B2.

In step 6 a determination is made if "B1" and "B2" are the same, or within a pre-determined acceptable proximity. An affirmative answer results in incrementing the LT counter, re-setting the "next" to be the first message, setting B1 equal to B2 and resuming the method from step 4. A non-affirmative answer results in the co-routine 10B being invoked with LT and location L as input.

Co-Routine B:

This routine continuously monitors a counter LT with respect to a location "L". Steps 1, 2 and 3 are meant to describe the monitoring of the counter LT. Step 4 is invoked only when the counter LT has a value that exceeds a pre-determined threshold, k. When invoked, step 4 compares the input locations "B 1" with a pre-configured location "L" to be proximate. If the test is affirmative, the value of the counter LT for location "L" is returned, else the monitoring continues.

Thus position data may be analyzed to create linger-time abstractions. As another exemplary embodiment we may consider a different method to create the linger-time abstraction that, in certain cases, may add more latency to the system.

[Alternative Linger-Time Procedure]:
1. The data records of position and time values are stored by a first system process.
2. A second system process examines the stored tuples for an uninterrupted sequence of successive tuples with the same location value but whose time instants t1, t2, to when summed yield a value greater than a pre-determined threshold, i.e., parameter "k" of method 10B (FIG. 7). [End Procedure]

This second alternative embodiment suggests a different abstraction that we may term as "Repeat Linger". The idea is that two linger-time events occur separated by a pre-determined time interval, say "k2". For example, a user may linger at the same location within two days and then occurs again within two minutes of the first occurrence. We may compute such an abstraction as follows.

[Procedure Repeat Linger]:
1. Find the linger-time abstraction with respect to a location "L" using the Alternative Linger-Time procedure.
2. Find the next linger-time abstraction with respect to the same location "L", again using the Repeat Linger-Time procedure.
3. Determine if the two linger-time abstractions are separated by the required time interval by computing the difference of their time instants, the difference between end of the first linger-time abstraction and the start of the second linger-time abstraction. [End Procedure]

Figure 6:
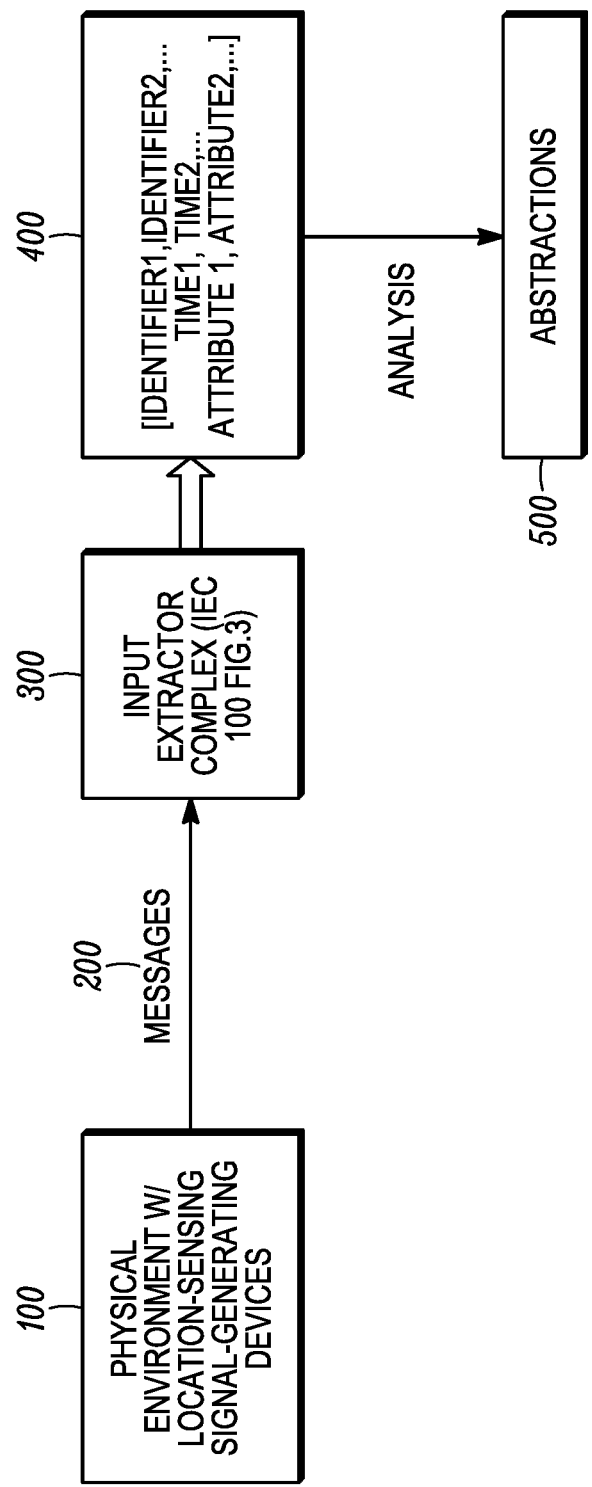
FIG. 6 illustrates the process of obtaining abstractions from data from a physical environment.

In summary, the process of analyzing input position/location data from ICDs to obtain useful abstractions is illustrated in FIG. 6. A physical environment (e.g., environment 100 in FIG. 1) has ICDs installed in it. The data from these devices is made available to Input Extractor Complex 300, also shown as IEC 100 FIG. 3, and which in FIG. 1 may be associated with SC 1000, via one or more communication links 200 (FIG. 6). The IEC 300 converts the input data to a generic data record format 400, which may then be processed by specialized methods, such as the example in FIG. 5, to produce a series of abstractions 500 (FIG. 6).

It should be appreciated that linger-time is only one kind of an abstraction. There are many kinds of abstractions that can be derived using location and time instant data values. For instance, one may consider abstractions relating to the change of location, rate of change of location, total number of such changes over an area, time spent at a location, average time spent at a location, etc.

Figure 7:
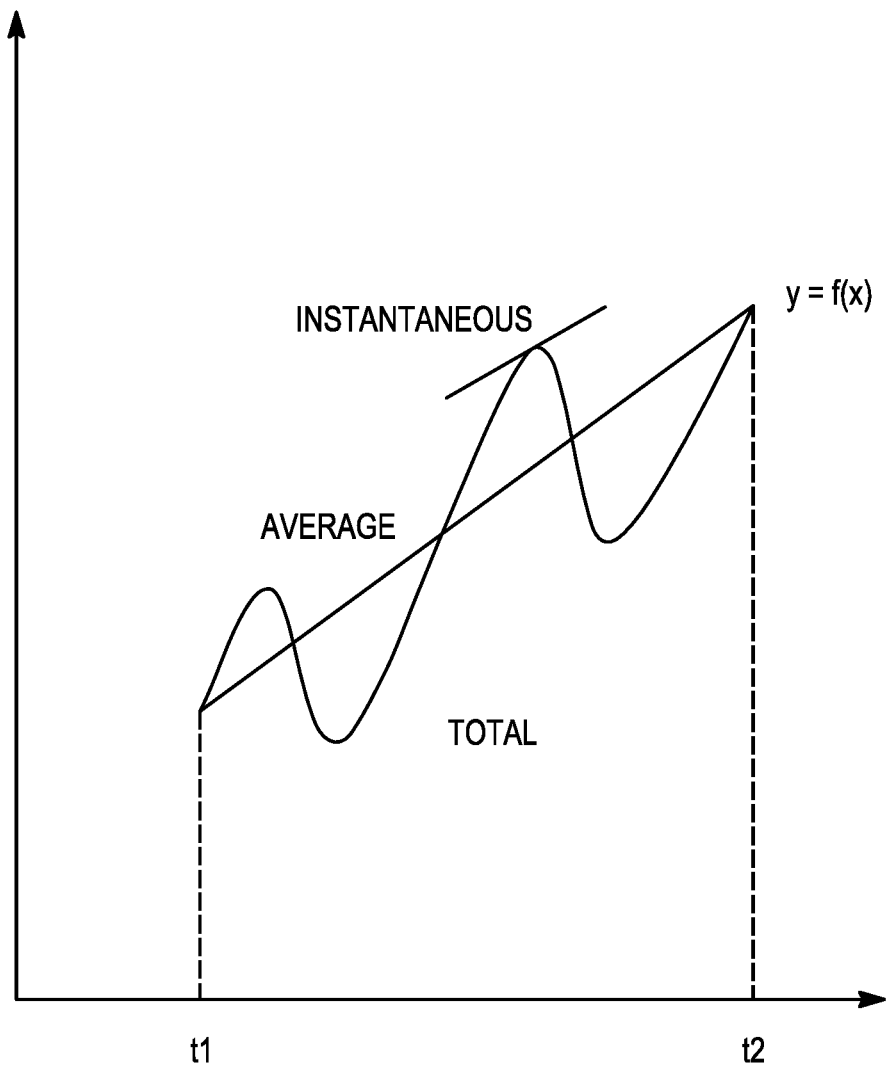
FIG. 7 shows a method of computing abstractions over position data.

One way to extract such movement related abstractions from position data is to look at the graph obtained by plotting position vs. time of the received data. Such a graph is shown in FIG. 7, which shows the function y=f (x). Now it may be seen that certain abstractions become immediately evident, viz., the secant of the function gives the average of the function over a given time period, the integral of the function gives the sum, and the derivative the instantaneous rate of change. Such abstractions may be computed periodically for given time periods and made available to applications.

When movement related abstractions are derived, it is often the case that we have a scale in mind. For example, we may want to see the velocity of a user in a range of 3 minutes. Thus, we may wish to observe the motion of said user at the scale of 3 minutes. Now assume that we obtain measurements of position several times a second from the incoming data feed. We can then average the input values received during the indicated time interval and claim that value as the velocity.

Alternatively, we may examine the individual velocities of a user during the indicated temporal interval (e.g., 3 minutes) and find them to lie within a range of velocity, say [5, 7] velocity units (e.g., 5-7 miles per hour). We may then assign a "letter" label to the ranges as shown in FIG. 8A. Thus, at the scale of 3 minutes the user velocities may be stored in the database as strings (FIG. 8B). Prior art teaches several efficient methods by which queries to a database of strings can be answered efficiently.

Thus, by introducing different temporal scales and assigning labels we can get efficient storage of large amounts of position data. Clearly, different labels can be assigned at different scales. Each scale and the labels associated with it represents a new set of abstractions. For example, at the exemplary scale of 3 minutes the abstractions may be S (SLOW), M (MEDIUM), F (FAST) and T (STATIONARY). We may then have different abstractions at a higher scale, say at the 10-minute scale. The notions of scale and abstraction allow us to store and retrieve data efficiently. Moreover, different applications may be interested in the movement data at different scales (abstractions).

Furthermore, one may examine the stored strings for certain patterns. For example, continuing with the example above, an application may be interested in user movements that represent MEDIUM velocity for 12 minutes. In this case the application may query the database of strings and search for substrings that match the pattern "MMMM" in the stored data. All user movement strings that have this pattern may then be returned in response to the query (FIG. 8C). Patterns extracted as substrings from stored data strings are also a kind of abstraction. Again, prior art teaches how substrings may be efficiently located in string data.

Returning now to the second exemplary embodiment illustrated in FIG. 2, we note that the hotspots within the retail establishment were displayed using an exemplary time period of 30 minutes. The positions of customers every minute, assuming the input data has a minimum arrival latency of one minute, of the customers was also required. We may thus satisfy these two requirements by using a single abstraction, viz., change of location with respect to time at two different scales: 1 minute and 30 minutes.

It may thus be seen that by using abstractions with different scales we can output data sets whose contents may be refined gradually. Different patterns in the output may be discernible at different scales. For example, the hotspots of FIG. 2 may only emerge after 30 minutes, before which only individual motions of customers are discernible.

Health-Related Data Feed

Many manufacturers have announced wearable computers and devices that contain sensors, e.g., smart watches available from Apple, Google, Samsung, etc. Some of the functionalities provided by the sensors in these devices gauge and measure the physical state of a user, e.g., his blood pressure, his heart rate, body temperature, pulse rate, etc. This data may be collected into abstractions. Wearable devices using Bluetooth Smart technology may use Generic Attribute (GATT) profiles that define a group of attributes for various applications. For example, the health profiles HRP, HTP, GLP, BLP etc., define several parameters such as heart rate, blood pressure, temperature, etc.

The present invention envisages that wearable computers and smartphones that contain sensors will provide personal parameters (GATT profile parameters) of users as a data feed to the IEC. For example, a list of personal parameters indicated as p1, p2, p3 and p4 may be input to the IEC in the form $$[p1,p2,p3,p4,t1,<x,y>, \ldots ]$$

wherein the data is further indexed by time "t1" and location "<x, y>" within an environment.

Following the practices described above, we may process the incoming input data received by the IEC and store it at different scales (with associated labels). For example, if one of the input parameters, say p1, is pulse data related to a user's heart rate, we may store the individual values, or we may store values that fall into labeled ranges over certain time periods, where suggestive labels such as FAST, NORMAL, etc., may be used. Again, different scales may be defined and different labels (abstractions) may be used at each different scale that may be referred to as abstractions. We may then search for desired patterns in the stored data and refer to certain patterns (sub strings) as abstractions.

More particularly, we may store the user health data as individual values v1, v2, etc. Alternatively, we may store the data labeled as FAST, NORMAL, etc., by storing the data at a scale of 5 minutes. We may then look for patterns of FAST and NORMAL interludes over a given time period, say one hour, and label that as RESTFUL, etc.

A key feature related to the input data received by the IEC should be noted. The patterns and information yielded by abstractions is obtained from first-hand data input from various sensors. Thus, unless one considers the unlikely possibility of error or foul play arising from the improper tampering of the various sensors, one may assume that the information contained in the abstractions is trustworthy. For example, consider user position data from which we extract an abstraction, say "15-minute-WALK" between two given locations "X" and "Z" with intermediate location "Y". In other words, consider an application that is interested in the abstractions (WALK) derived from stored position data of users and retrieve those users that may have taken a 15-minute-WALK daily.

In this example, we wish to consider a WALK abstraction as motion with a velocity that falls in the range [5,10] units, assuming people's walking speed is in that range, thereby excluding faster motion, by car for example. We wish to ascertain the route of the walk to have been via the intermediate location "Y", so no alternate routes are allowed, etc.

All of these conditions can be programmed into an application and verified by recourse to the user's position data, which in turn comes from sensors in a physical environment or from sensors from his smart phone. Alternatively, we may store the user's position data and derive abstractions from it at the scale of 15 minutes and label the abstractions at this scale as SLOW-WALK, WALK, FAST-WALK, RUN, TOO FAST, etc. We may then extract those substrings from said abstractions that satisfy the indicated conditions, e.g., WALK passes through indicated intermediate locations, occurs daily, etc.

We thus achieve two goals. The task of the application is made easier by providing the indicated abstractions. Secondly, the application (or any other process) may verify the indicated abstraction by recourse to the stored (first-hand sensor) data. The latter observation may have certain consequences. The fact that physical motion of users may be verified means that physical motion may form the basis of verifiable transactions, i.e., the system can be interrogated to verify that a user "Mary" actually took the walk that she claims to have undertaken. Such verifiable transactions may then be used in cyber transaction systems, e.g., in systems that use verifiable transactions to generate virtual currencies.

Moreover, this kind of verification is not limited to abstractions derived only from physical environments but, rather, applies to any kind of environment including virtual environments, as long as abstractions are derivable from data input from sensors and ICDs in said environments.

Data Feed from Software Systems

Many software systems are being instrumented in order to allow IT professionals to debug the software system, gain an understanding of the performance characteristics of the system, optimize the performance of the system, etc. It is commercially desirable to recognize anomalous behavior patterns while a software system is running as soon as they occur and possibly rectify such behavior. For example, e-commerce websites typically earn revenue by supporting financial transactions. Problems with a site's transactional software may cause loss of revenue.

In order to monitor the behavior of software systems and applications, prior art allows software to be instrumented, i.e., certain parts of the code are modified to produce messages that may be collected into logs (typically called event log files). IT (Information Technology) professionals may then analyze said log files to discern problems and rectify said problems.

In analogy to the above descriptions of sensors and ICDs, it is observed that an instrumented software system may also be viewed as an object with embedded sensors. The instrumented fragments of the code in a software system may be viewed as individual sensors (software sensors) that send out signals (messages in a certain format) that may be collected by an intermediate device (e.g., a server where the individual messages are collected into a log file) and forwarded to SC 1000 (FIG. 1). Alternatively, each individual message may be sent directly to the SC 1000. Thus, the software system may be viewed as an ICD containing embedded software sensors.

The question then arises, what is the environment corresponding to the software system in analogy with the physical environment 100 of FIG. 1? In other words, can we associate an environment (or equivalently, a space) whose coordinate units may be used to measure quantities and changes to quantities with respect to other quantities in said space.

For example, in the environment 100 of FIG. 1 the description of location and time was based on the common understanding of spatial coordinate units and temporal units. A mobile phone being located at spatial coordinate (5,7) units and temporal coordinates 2 pm is well understood in prior art.

In a likewise manner, it would be beneficial to locate software system abstractions in an environment (space) with coordinates and then compute changes to said abstractions because such a representation would allow us to compare and measure quantities.

We now show how a certain kind of environment, called a geometric space, can be associated with the execution parameters/abstractions (e.g., CPU utilization, memory usage, etc.) of a software system.

Consider two data records derived from the analysis of the input data from a software system by IEC 100 of FIG. 3.

[ID=123, t1, P1, P2, N1, N2]
[ID=345, t2, P1, P2, N1, N2]

The meanings attributed to the data records are as follows. The first data record has an identifier "123" and said data record represents the fact that process P1 and P2 respectively invoke each other N1, respectively, N2 times during time interval "t1". A similar interpretation is attributed to the second data record.

Let $$D = \sqrt{(N2-N1)^2 + (P2-P1)^2}$$

and $$A = \tan \frac{N2 - N1}{P2 - P1}$$

Figure 9B:
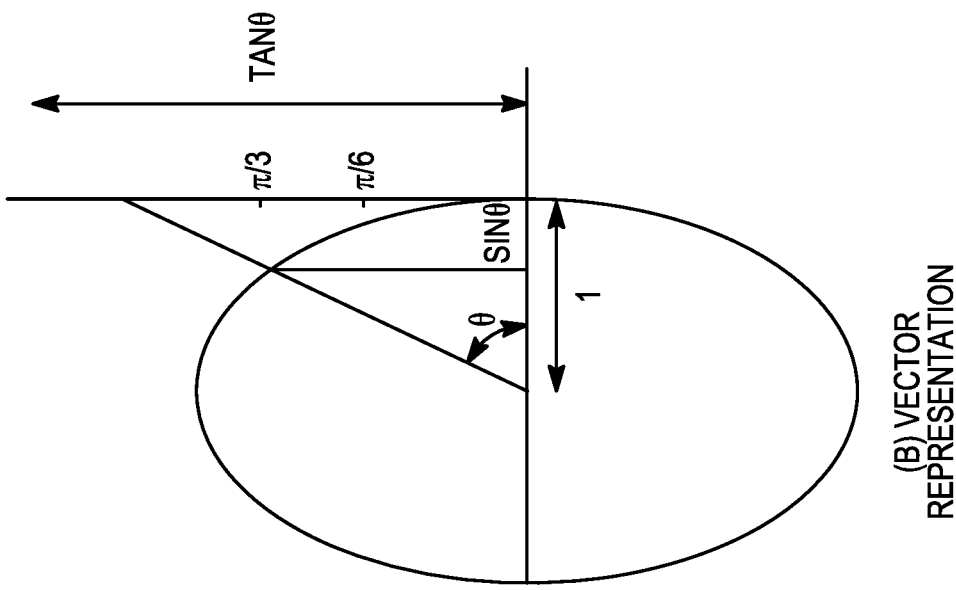
FIGS. 9A and 9B illustrate obtaining abstractions from a virtual environment.
Figure 9A:
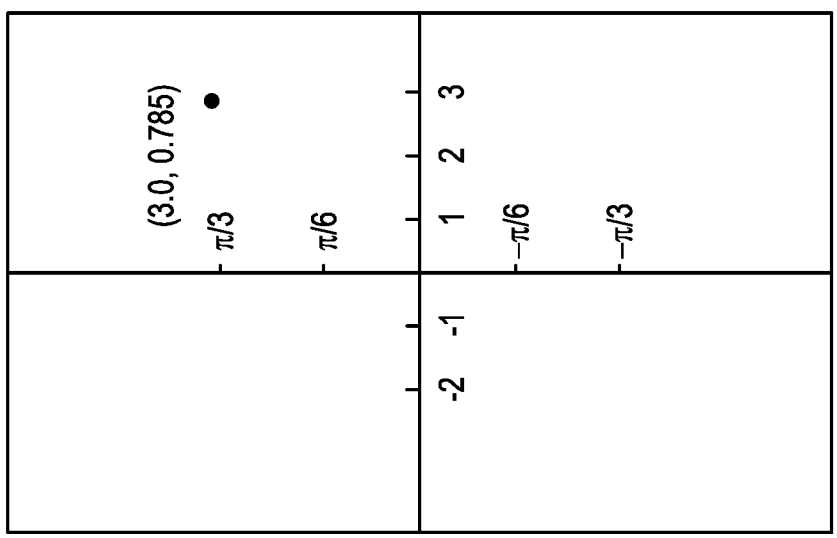

Assume a two dimensional coordinate space as shown by FIG. 9A. The x-axis of the space is given by real number values as is the y-axis. Now locate the point (D, A) on said coordinate space. As an example, a point with D=3.0 and A=0.785 is shown in FIG. 9A. We may refer to the coordinate "D" as the magnitude and the coordinate "A" as the direction.

We may thus say "magnitude" is an abstraction of the software system that gives the change in magnitude of process P1 with respect to process P2 and "direction" is an abstraction that gives the change in direction of the process P1 with respect to P2. Similar abstractions may be computed for process P2 with respect to P1.

It is to be observed that the name "magnitude," etc. is arbitrary and purely descriptive. What is important is that a property (i.e., abstraction) describing one aspect of the execution of the software system is defined and the value of such a property can be computed and compared.[1]

[1] In analogy to quantum mechanics, quantum particles are said to have a property called "spin" which is a purely descriptive term but its value can be computed and compared to the spin of other particles. No one knows whether quantum particles actually spin or not.

We have thus defined two new abstractions, magnitude and direction, related to the execution of a software system. These abstractions may be thought of as properties of the execution.

Thus, as the execution of the software system proceeds, new abstractions may be extracted from the input data arriving at IEC 100 of FIG. 3. These abstractions represent certain properties of said software system. Said abstractions may be located as points in a geometric space, and the locus of all such points may be said to represent a surface (e.g., curve) of execution (just as points in a conventional two dimensional space represent a path of a moving object).

It may be argued that the properties we have extracted from a software system may not all have a bearing or have varying degrees of bearing upon the execution of said software system. That indeed may be true. However, over the course of several trial runs, human experts may provide input on the various properties and their efficacy and usefulness. Hence, a learning function may be able to learn over time which properties are more useful than others, using human actions as a training set. Such an embodiment is described later.

In summary, we propose to model the execution of software systems by associating said execution with one or more geometric spaces (of one or more dimensions). Input data messages from said software system may then be analyzed to extract abstractions as explained above. The changes in one or more abstractions may also be computed as described above.

FIGS. 9A and 9B show a coordinate and vector representation of the magnitude and direction abstractions.

Following the practice and technique outlined above, we may store the derived abstractions at different scales as shown in FIG. 10A. The stored data may be subsequently queried for patterns of interest. For example, we may wish to find all processes that are operating with NORMAL direction and magnitude, etc.

An advantage of the representations of abstractions is that we may characterize the running behavior of a software system. For example, assume a software system (an application) that uses certain abstractions is executed. During the normal running of the system, it generates data, from its instrumented code components, which is stored and analyzed to extract abstractions, which are in turn stored at different scales. Now we take a snapshot of the various abstractions as they are being used in the running system and call such snapshots signatures of the system. A signature of a system may be thought of as indicating the state of the abstractions used in the system. For example, in FIG. 10B, if the two abstractions shown as "Abstraction1" and "Abstraction2" are taken as a signature at 5 pm, we may then make the statement, among other such statements, that the signature indicates that abstractions Direction-2 and Magnitude-2 are both operating in the NORMAL range.

Continuing with the example above, if we assume that the state indicated by the above exemplary signature represents the system "running normally" (as deemed by a human expert) then we may have an application querying the database for departures from said signature, i.e., the application queries the database for values that vary from the signature values, equivalently, the application looks for patterns that do NOT satisfy the conditions of the signature.

Thus, the abstractions discussed in the present invention may be used to debug and monitor the running behavior of a software system. We may capture the above discussion by the following concise method description.

[Procedure: Abstract Vector Spaces]
1. Given a log file of events, consider each record of the log in turn.
2. Select two attributes whose magnitudes (rates) are to be compared.
3. Compute the magnitude and direction of the corresponding vector.
4. Store the vectors as tuples of the form <magnitude, direction>, e.g., <2.3, ½>.
5. Store the computed vectors as labels, e.g., POSITIVE, NEGATIVE, ZERO. [End Procedure]

Input Data from Messaging Systems

Many kinds of messaging systems exist on the Internet such as Twitter, instant messaging systems from Facebook, Google, etc. Such systems send out streams of messages at a fast rate.

Figures 11A, 11B, 11C:
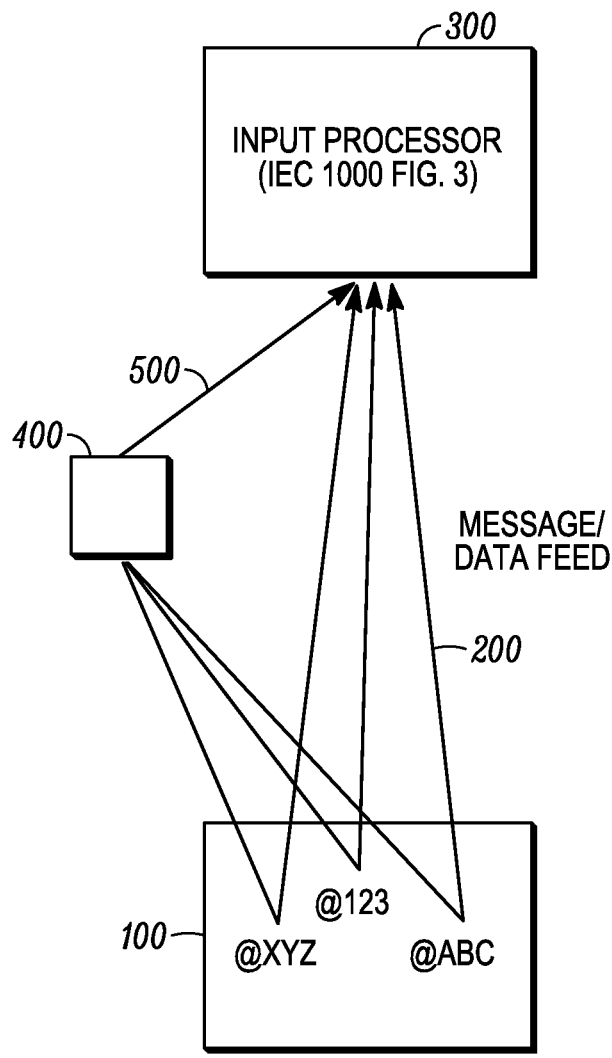
FIG. 11A, 11B, 11C illustrate user identities acting as virtual sensors in Twitter, exemplary Occurrence and Density tables, respectively.

In analogy to the discussion of software systems, a messaging system may also be viewed as a virtual object containing virtual sensors as follows. The user identities existing in the virtual execution space of the messaging system may be viewed as virtual sensors in the sense that the virtual identities emit messages every now and then. Copies of said messages may be provided for input processing analogous to the software system discussion above. FIG. 11A shows a (virtual) execution space 100 of Twitter containing three user identities @xyz, @abc, and @123 acting as (virtual) sensors whose messages, collectively labeled as 200 in FIG. 11A, are input to the Input Processor 300 (also IEC 100 of FIG. 3). In fact, Twitter provides a data feed of all its messages as a commercial service and enterprises may subscribe to this feed, called "the fire hose", for a certain monetary fee. In other words, Twitter aggregates its messages into a single data feed, by using one ore intermediate servers, and provides said data feed to enterprise customers. The latter alternative arrangement is shown in FIG. 11A where 400 represents the intermediate server(s) and 500 is the aggregated data feed input to 300.

It may be pertinent to summarize our view of sensors as used so far in this presentation. The conventional interpretation is to view sensors as physical devices that may be installed in a physical space to measure certain quantities. Physical sensors may also be embedded into other physical objects. Messages or signals from physical sensors typically contain sensor identifying information so that one sensor and its messages may be distinguished from another.

Next we extended the notion of sensors to include instrumented pieces of software, said instrumentation emitting a series of messages during the running of said software system. Such messages also typically contain identifying information by which the location of the instrumented code within the software system may be determined.

In the case of messaging systems, we observe that at any moment during the running of said system, there exist one or more user identities in the (virtual) execution space of said system. Moreover, these virtual identities may be distinguished from each other by one or more unique identifiers that are included in the messages emitted from said identities. In the case of Twitter, these unique identifiers may consist of usernames preceded by the "@" symbol. In other systems the user identities may be some other kind of unique identifier, e.g., email identities, even an IP address (as long it satisfies the requirements listed below).

Thus, the notion of a sensor includes physical devices, or pieces of software in a virtual environment of a software system, or user identities in a virtual environment of a software system, etc. The necessary requirements for a sensor are that it emit messages, and that said messages contain one or more identifiers from which the identity of said sensor may be determined and distinguished from other sensors.

The original purpose and use of messaging systems was to allow people to communicate between themselves. In today's world where all kinds of data are analyzed, prior art teaches how the messages may be analyzed for trends, topical events, etc., and how such analysis may be used for commercial advantages, e.g., targeted advertising.

In this vein it would be of commercial advantage to analyze Twitter like messaging systems for abstractions. In the following discussion we discuss the present invention with Twitter as an exemplary messaging system but note that the ideas of the present invention are general applicable to many types of messaging systems.

To review the previous discussion wherein software systems were analyzed with respect to extracting abstractions, we recall that the messages originating from a running software system were converted into the preferred data record of the present invention. Various abstractions were then extracted from the data records.

A certain kind of geometric space was associated to act as an environment corresponding to the execution space of the software systems and additional abstractions were extracted relating to properties of said space.

In analogy to the treatment accorded to software systems above, the following questions may be posed.
1. Can Twitter messages be treated as messages coming from an ICD?

2. Can said messages be converted to the preferred data record format?
3. Can abstractions be extracted from the data records?
4. Can a geometric space be associated with the execution space of Twitter so that various properties, i.e., abstractions, may be extracted of said space?

It is to be noted that whereas in the case of software systems the abstractions were intended to help diagnose various performance-related problems, in the case of messaging systems we are concerned with extracting the concepts and topics that are ongoing when said messaging system Is running. We view Twitter-style messaging systems as a marketplace of ideas and while executing, Twitter's execution space has many different ideas, topics, etc., that are trending, morphing into other topics, and changing in a myriad way. The notion of associating a geometric space to said execution space is then an attempt to extract the various properties of said execution space.

The following presentation is organized as an extended response to the above questions.

Twitter messages are called "tweets". An example of a tweet is as follows.

"@sender # Obama announced a balanced budget dealing # blow to # Republicans"

Here the term @sender is a user's Twitter identifier and the message sent out as the data feed is as indicated. The "#" indicates a special word, called a hashtag. At the present moment a tweet is limited to a certain number of characters (140). It may thus be re-formatted to conform to a format described as

[sender ID, message words, hashtags].

Certain information inherent in a series of tweets is obvious. For example, hashtags are often used to describe a context or a relationship, e.g., # Obama. Thus, tweets containing the same hashtags may be collected and analyzed together. This sort of analysis is conventional and specific to an application.

Consider three tweets, one that contains the word "Obama", the second the word "Republican" and the third "Budget". Most people would agree that there are inherent conceptual relationships between the three word occurrences. One such conceptual relationship may be dubbed "politics". The three tweets in question may be considered as being related provided a conceptual category comprising "Budget", "Obama" and Politics" can be recognized. Note that the tweets in question may or may not contain reference hashtags. In any case not all conceptual relationships can be captured in hashtags since the number of concepts is quite large, senders of tweets may be unaware of all concepts and the number of characters allowed in a tweet is limited (currently, the limit is 140 characters).

One set of abstractions inherent in tweets is therefore the conceptual categories into which various tweets may be collected, i.e., a given tweet may be considered to belong to or be a member of conceptual categories C1, C2, . . . , Cn. Moreover, the time when such conceptual categories come into existence or change may be of interest and relevance. (Categories may be thought of as the analogs of the words "concepts", "topics", etc., used in the above preliminary discussion.)

The problem in identifying and constructing the categories C1, C2, . . . , Cn, may be succinctly described as follows. Given a word in a tweet, what conceptual categories does it belong to? The question pre-supposes the existence of the indicated categories.

We observe that words belonging to conceptual categories may not be related to each other by the conventional meaning of words as per a dictionary usage. The words "Republican" and "Budget" are not related by dictionary meanings. Rather they are related by usage by which one might mean that in common and everyday usage the two indicated words occur "together" and the number of such occurrences is quite large.

In particular, we observe that the web consists of more than a billion pages, a number of which contain textual descriptions (articles, summaries, . . . ) of various topics. Could such pages be analyzed to collect words that "occur together" ("related") wherein the number of such occurrences is "sufficiently often"?

The answer to this question forms the basis of one set of abstractions inferred by the present invention. Specifically, tweets are analyzed and segregated into different conceptual categories that have been derived previously by a corpus comprising a large number of web pages.

In a first step we extract the words and the hashtags, delete "useless" words, e.g., conjunctions, disjunctions, prepositions etc., and create a collection of words for each tweet or status message. A chunk contains words from a pre-determined number of tweets. Given a chunk (of collections), we use a certain process that given a list of words, will group said list into one or more categories. Words in the same category are determined by said procedure to belong to or are related to the same conceptual category. This does not mean that the words in a category have a common meaning; rather, it means that the words have a common conceptual basis. As an example "smartphone" and "iPhone" may have a common conceptual basis if the said process determines that the two words are "related". The method by which words having the same conceptual basis are generated is described below.

As stated above, the method relies on using web pages as source documents, i.e., the corpus that is analyzed to produce the initial categories. Such documents may be obtained, by way of one example, from vendors who provide extracts consisting of tens of thousands of web sites. Alternatively, one may obtain web pages by a crawl mechanism from prior art.

The method is based on constructing two different types of tables of data from a web page. The first table is the frequency of occurrence of words occurring on a web page, i.e., source text. For example, if the source text contains the sentence "The quick brown fox jumped and jumped over the fence, and the jumping made the fox tired" then the frequency counts of the words in the sentence would be as shown in FIG. 11B.

The second table is the intra-word-occurrence-distance and is computed by counting the number of words that separate two occurrences of the same word (in this case "useless" words are assumed to not have been deleted from the original message). In the sentence above, namely, "The quick brown fox jumped and jumped over the fence, and the jumping made the fox tired" the words "jump" and "fox" occur at word positions [5,7,13] and [4,16] respectively. Thus, a table can represent the intra-word-occurrence-distance is shown in FIG. 11C.

Using (normalized) standard deviation (or other Fisher-style statistical tests known from prior art) the method derives the "significance" of a word in the source text based on the frequency (occurrence) count and the density of occurrence, i.e., smaller intra-word-occurrence-distances. The crucial assumption in density calculations is that words that occur with high density and high frequency share a common conceptual basis. A threshold is determined, through simulation and experiments, and words whose significance exceeds the threshold are retained. Alternatively, machine learning processes may be used to obtain tighter bounds on the words in a category and retain only those words in a category that satisfy the learning function. In various embodiments of the present invention it is envisaged that the words on a web page may be pre-filtered to remove nonsense words, misspelled words, obscene words, or commonly occurring words and prepositions such as "I", "it", "she", "and", "but", etc. The retained words are collectively referred to as a "conceptual category". Thus, words in the same category are related to each other by virtue of their membership in a category.

The proposed method takes as input several web pages and constructs a database of conceptual categories. Given a word as input, the database may be queried to find conceptual categories that it belongs to, or equivalently, given two words we may use the database to determine that they are related by virtue of their membership in the same category. Moreover, a measure of the strength of the relationship between two given words may be established by considering the number of conceptual categories of which they are members. Thus, if "A" and "B" belong to the same N1 number of categories and "A" and "C" belong to "N2" number of categories, and furthermore if N1 is larger than N2 then we may assert that "A" and "B" are more related than "A" and "C".

The proposed method may be summarized as follows.
[Procedure: Conceptual Category]
1. Given several web pages, consider each in turn.
2. Derive one or more conceptual categories from the contents of each page.
3. Construct a database containing the derived conceptual categories. [End Procedure]

In certain cases, we may wish to seed a conceptual category with known information. For example, suppose we agree that words beginning with the digits "12", or words that contain the character string "#" need to be considered as significant words. Other examples may include special words such as user identifiers as used in computer accounts on websites or email names, etc. In such cases we modify the method described above as follows. We associate a pre-determined frequency and a pre-determined distance with such words and add them to the frequency and distance tables derived by the method described above. In this way the specially designated words gain membership into a conceptual category.

It is to be observed that membership of words in a category is transient, i.e., a word may be removed due to changes in the Occurrence and Density tables (it is assumed that these tables are periodically updated).

Figure 12:
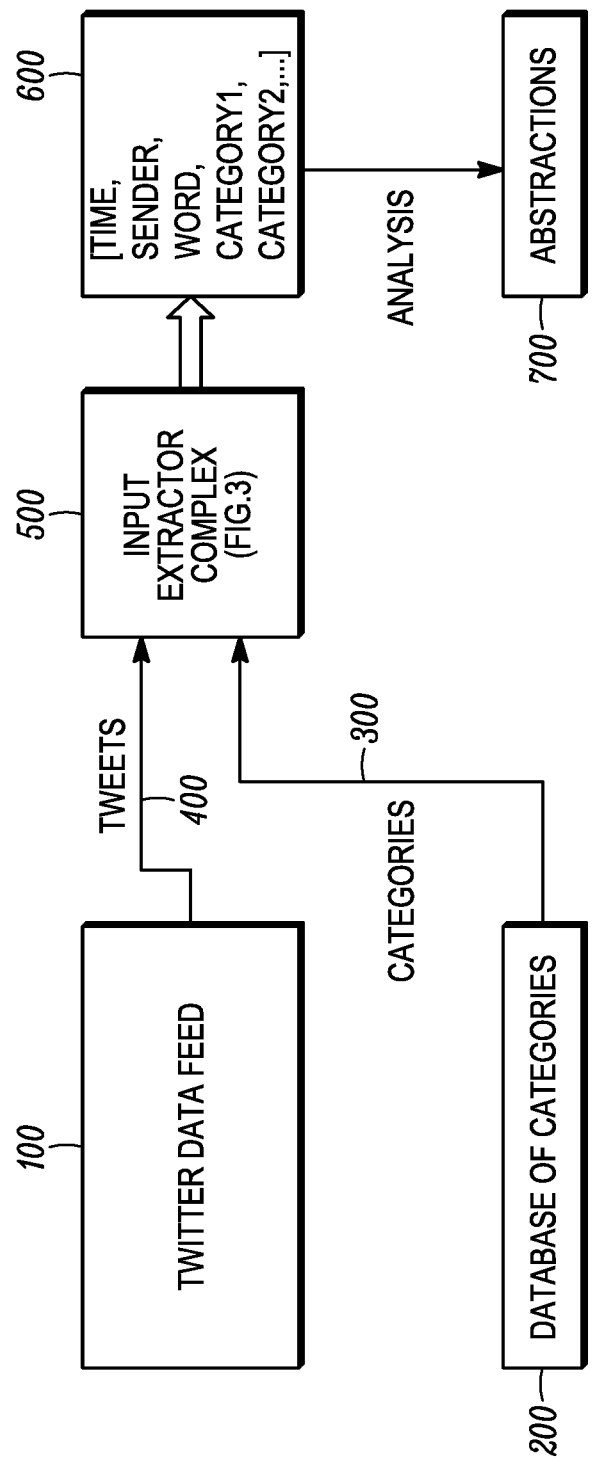
FIG. 12 illustrates the process underlying conversion of twitter messages into data records that may then be used to extract various abstractions.

The database of conceptual categories may be used, in conjunction with input tweets to derive input data records in the preferred format of the present invention. This process is illustrated in FIG. 12.

Input Twitter data feed 100 comprising tweets 400 arrive as input at the IEC 100 of FIG. 3 (shown in FIG. 12 as 500) where each tweet is converted into one or more data records as follows. Each word or hashtag in the tweet is matched to one or more categories from the Database of Categories 200. Thus, the resulting data records have the following format.

[Time, Sender, Word1, Category1, % category1, Category2, % Category2, . . . ]
[Time, Sender, Word2, Category7, % Category7, Category9, % Category9, . . . ] Etc.

In the above example format, % category refers to the cardinality (i.e., number of unique words in a category) of the named category given as an integer value.

It is observed that the above data record is similar to the data record obtained for software systems above. Thus, as explained above, abstractions may be derived from such a collection of data records. The following abstractions are listed as exemplary.

Entry time: The average time at which a word in a tweet enters into one or more categories.
Exit time: The time at which a word is removed from a category.
Positive Category Velocity: The instantaneous rate at which words enter into a given category (number of new words entering a category over a given time period).
Negative Category Velocity: The instantaneous rate at which words are removed from a given category.
Positive Word Velocity: The average rate at which a given word enters one or more categories.
Negative Word Velocity: The average rate at which a given word is removed from one or more categories.
Total New Words: The total number of words that enter/exits a category over a time period.
Total New Category: The total number of categories a word enters/exits over a time period.
Etcetera The above list of potential abstractions is exemplary and several variations of the above may be determined using the methods described above for the exemplary software systems description. Abstractions may also be derived and stored at several scales as described above for eventual use by applications.

As in the case of software systems, one or more geometric spaces may be associated with the execution space of Twitter-style messaging systems and deriving new properties of the execution space may be determined such as "Magnitude" and "Direction" for the case of software systems.

The notion of a signature of abstractions was introduced in the example pertaining to software systems above. The same notion may be used in the case of messaging systems for the same purpose but, additionally, it may also be used for a different purpose.

Unlike the case of software systems wherein the goal of the signature was to derive and represent a normative case of execution, in the present case of messaging systems it may be used to derive and represent a normative case of the categories being used in a messaging system at a certain time interval. Departures from the normative case may then be analyzed either by mechanistic processes or by means of human-machine curation processes (as described later).

When a departure from the normative case is detected, the potential exists that the properties (e.g., the concepts or topics or categories under execution) have changed. Such changes may be analyzed and used for commercial advantages if we assume that changes in the conversations ongoing on Twitter reflect or are indicative of changes in the real world. For example, the new categories in the execution space may be used for selecting advertisements related to the new categories that are to be delivered to online clients.

Novel Features of the Broker & Storage System

The workings of the Broker (900) may be divided into two main categories.

First, the Broker accepts incoming data records that have been suitably formatted by the IEC 100 (FIG. 3).

We base the inter-operation of the Execution Pipelines (EP) 200 and the API Publishing Engine (PE) 400 (FIG. 3) as a set of asynchronous (producer-consumer) processes working on a common (shared) storage system module, i.e., the broker 900. The PE produces data that is stored in the Storage System (either 300 or 350) by the Broker. The PE accesses the SS via the Broker for its needs. Thus, the Execution Pipelines 200 is the "producer" and the PE is the "consumer". The timing of the "production" and the "consumption" is not related, i.e., the two processes operate asynchronously). The producer process may be thought of as a "writer" and the consumer process as a "reader" in simpler terms. Moreover, the writer process is greedy in the sense that it accesses the Broker for storage operations whenever it has data to write; however, the reader process is constrained by the availability of the data.

Thus, the requirements for the Broker are as follows.
1. The number of writes far exceeds the number of reads in any given time interval.
2. The Broker needs to provide consistency and fault tolerance across the entire address space.
3. The Broker needs to allow efficient range queries.

To satisfy these requirements the Broker treats its address space in a particular manner, i.e., it treats it as consisting of a virtual toroid. The address space of the torus is spilt into partitions without overlap, with partitions being contiguous so that the entire address space is covered. Each partition has a partition manager and only one partition manager. It is a basic feature and requirement of address spaces organized in such a fashion that the retrieval and storage times are fixed and must be made independent of the underlying technology.

The torus address space of a torus is defined as follows. Let "c" be the radius from the center of the hole to the center of the tube, and let "a" be radius of the tube. Then the parametric equations for a torus azimuthally symmetric about the z-axis are $$x = (c + a \cos v) \cos u$$

$$y = (c + a \cos v) \sin u$$

$$z = a \sin v \text{ where } u, v \in [0, 2\pi]$$

For its address space, the Broker defines multiple partition managers m1, m2, etc. A data item is mapped to a point in the address space under a certain manager. Care is taken to evenly distribute the data items across partitions so that the partitions are evenly balanced. Periodic re-balancing may be needed. Thus each partition manager is responsible for a region (range) of the torus space. Efficient retrievals are now possible as an entire range can be returned when queried.

If there is a failure in one of the partitions, we need to expand the nearest two partitions to take responsibility for the data items in the failed region. Thus the neighboring regions expand. This expansion may necessitate a re-balancing of the regions. It should be noted that no restriction is placed by the torus abstract space on the physical distribution of storage nodes; the latter could be distributed over a large geographical area.

The Broker maps its virtual address space to one or more storage systems, e.g., the Storage System 1 and Storage System 2. In particular, different methods and rules or heuristics may be used to map parts of the virtual space (and hence its contents) to a storage system. For example, we may map each virtual partition to a particular storage system.

Thus, the address space of the Broker in actuality contains data (i.e., references) that point to locations within, or other storage systems. These references may be provided to the relevant storage system that, by an act of de-referencing, effectuates the required retrieval or storage of the actual data item(s).

Moreover, these references are cognizant of the latency of each reference, such cognizance being a function of the particular storage system. (This cognizance is used in choosing the storage system wherein a particular abstraction is to be stored, by way of example.) In some cases, such cognizance may be obtained from the supplier's information about a storage technology; in other cases, it may be gleaned from past experiences and previous usage.

Figure 13:
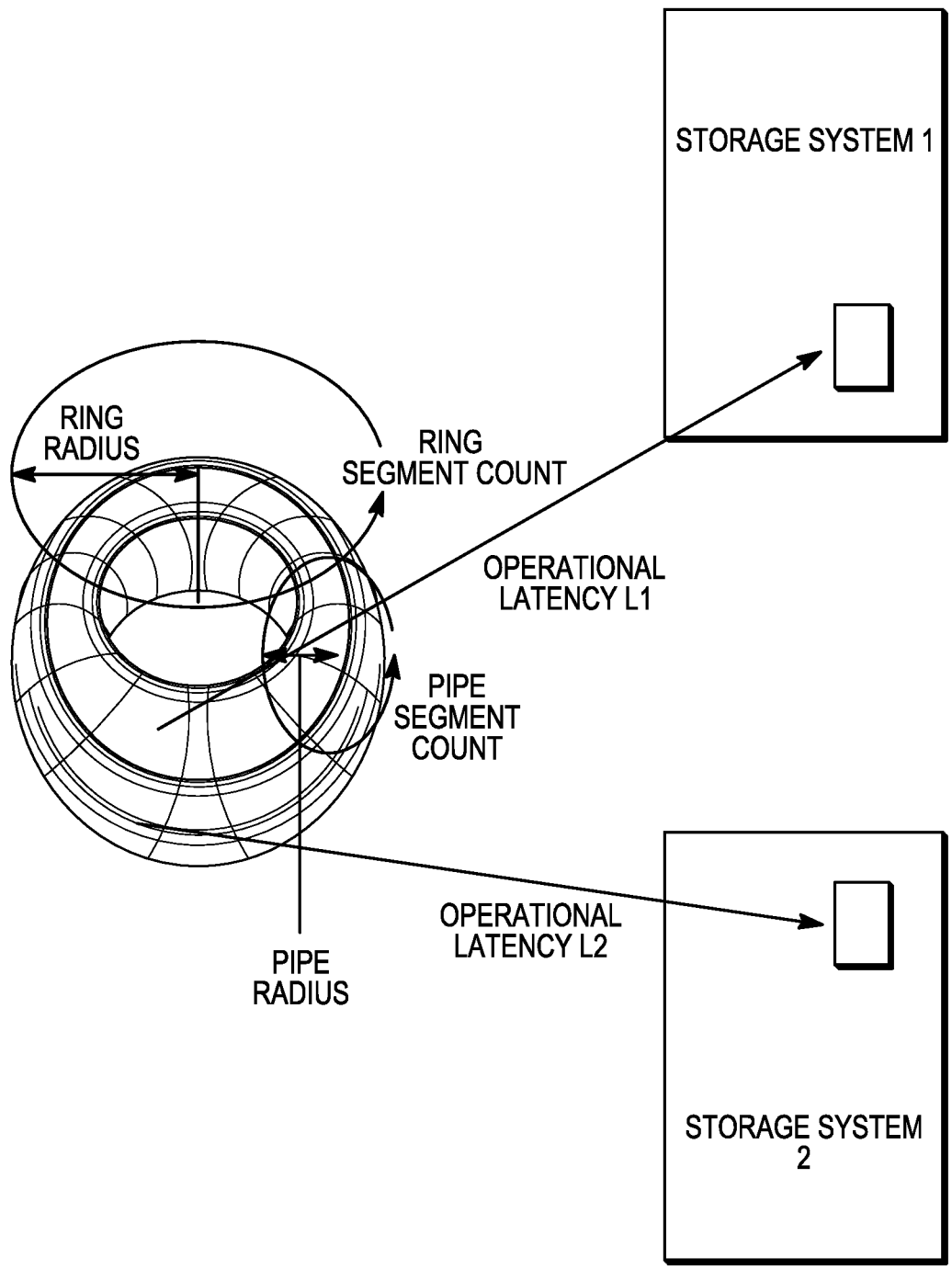
FIG. 13 illustrates the two level operational structure of the Broker Subsystem.

Thus, the Broker uses a two-level strategy in its operation as shown in FIG. 13. When asked to retrieve/store a data item it computes a location in its toroid address space where said operation is to be performed, i.e., location where item is to be stored or retrieved. A reference is placed at said location. Operation is then handed over to a second-level process that requests the data item to be stored (respectively, retrieved) from the storage system by de-referencing said stored reference.

Internet Minute Clock (IMC)

In the preceding descriptions we have referred to the present invention's concern with latency. Clearly, sensing the environment and computing the data from the incident input data feeds takes a certain amount of computational and communication time. Additionally, the data feeds have a built-in processing and networking delay. We call this delay the "level of ignorance" factor. A generated data set will always be ignorant, i.e., have latency, of what happens in an environment during a time factor that is greater than the level of ignorance. Thus, the level of ignorance factor is a basic feature of the system, i.e., the system lags behind events in a given environment in the sense that its representations of the source are always delayed by a certain factor.

The situation, however, is more complicated. We must also add the computation time of generating the output, working of the PE, etc., to the level of ignorance factor. Let us call this the compute time. We refer to the sum of the compute time and the level of ignorance as the "Internet Minute".

Note that the compute time can be lowered by a certain factor by adding more compute power or other resources to the system. However, going below a fundamental limit of compute time is not possible because of the inherent cost of all parallel and distributed computational schemes.

Applications may request a desirable IMC period for their internal use. Thus, the IMC may be requested by individual applications. However, in some cases, the requested time period may not be provided because of technological (e.g., unable to provision faster server machines), economic (e.g., requested time period would cost too much) or fundamental reasons (e.g., speed of electromagnetic radiation).

Figure 14:
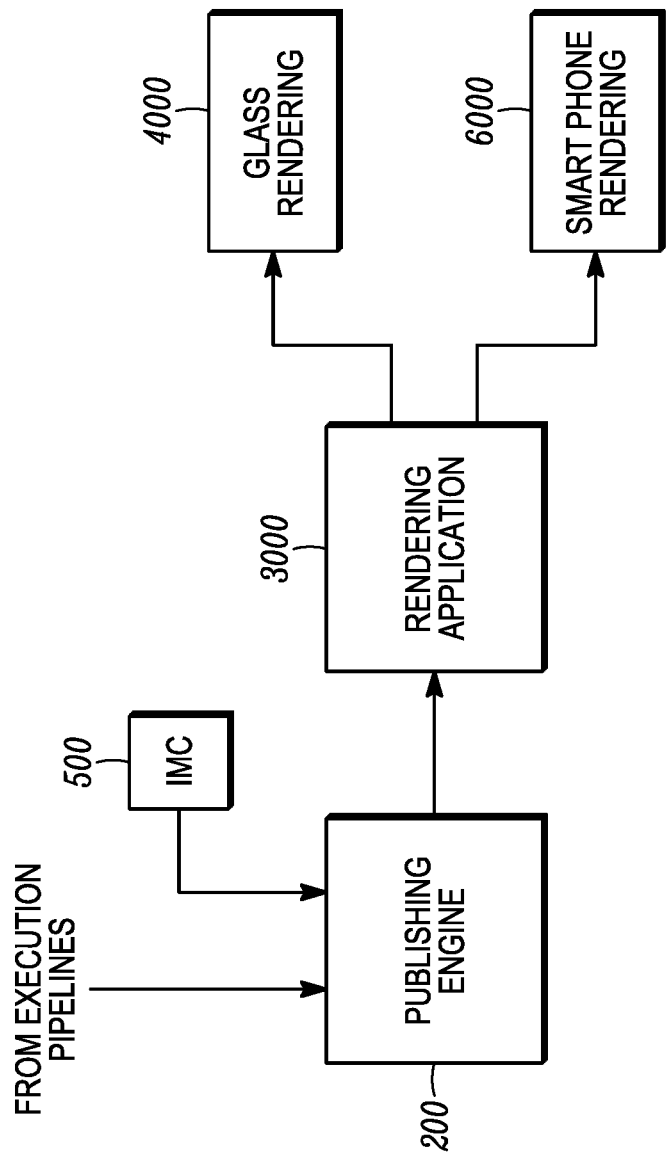
FIG. 14 depicts an exemplary enablement of the invention.

Based on the details of the present invention provided in this presentation we discuss one final possible enabling embodiment with reference to FIG. 14. A user is roaming in a physical environment. He is wearing a smart vision system (a lá Google Glass) and is also carrying a mobile phone (as is required by Google Glass). The physical environment he is roaming in contains ICDs, possibly conforming to the iBeacon specification; data from said devices is relayed by the user's mobile phone application(s) to the system of the present invention.

An exemplary application running on the system, as described above, produces successive data sets, i.e., updated versions of the data sets are produced at a pre-determined rate by the application, said rate being determined by the IMC Clock 500. The successive data sets are consumed by the PE complex and given to the Rendering application 3000 of FIG. 14, which in turn, renders a notification on the Glass device 4000 and an advertisement object on an application on the user's mobile device 6000.

The advertisement shown on the user's mobile device (and whose associated notification is rendered on the Glass device) is chosen by the application by seeking bids of possible advertisements from an advertising network. The targeting criteria or user context provided to the advertising network by the requesting application is based on an analysis of the Twitter feed of the user, i.e., concepts currently being discussed relating to the physical environment in which the user is roaming are used to determine targeting criteria for advertisers.

Verification and Analysis of Sensed Data

As previously mentioned, abstractions may be verified by recourse to the (first-hand) data received from sensors and ICDs from one or more environments. The example was presented that a physical activity such as a walk undertaken by a user from a starting location to an ending location, with possible intermediate points and other associated conditions such as temporal intervals, etc., may be treated as an abstraction, or as being composed of one or more abstractions, possibly mixed with other kinds of data. The said abstraction (walk) may be verified by recourse to the data received from sensors and ICDs. That is, the verification can be carried out by use of computer-based software operating on data from sensors and/or ICDs. It was observed previously that verifications apply to all abstractions derived from environments and are not limited only to abstractions involving physical movements.

In this section, analysis and verification of abstractions is discussed further, with particular emphasis on the case when one or more components comprising said abstraction may not be verifiable solely by automatic means (i.e., using computer software operating on data received from sensors or ICDs) only.

Consider, by way of example, that we are interested in verifying a walk undertaken by users with the associated condition that users must stop at one or more intermediate points and consume a diet supplement or medication. Now, the latter constraint may not be verifiable by using software and data only. We may need to use one or more humans acting as witnesses, experts, etc., who may submit data that may be used in the verification. For example, a human user may be sent an encrypted message asking him to verify that said user performed an indicated and specific action. The human user may then respond, in a secure way so that his identity may be verified, e.g., by using a signed cryptographic key, and said response may be taken to verify the underlying (physical) activity.

In the above example the message, sent to the human user who helps in the overall verification of the abstraction, may contain information relating to the user and his physical activity in order to help the human user in his response and decision making. Said message may be crafted so as to be brief, accurate, contain relevant information, and be timely, etc. Said message creation techniques may use stored historical data to craft the message, may use machine learning techniques to craft the message contents, etc.

As another example, consider the problem of diagnosing whether a software system is acting abnormally. As explained above, event log messages from the various instrumented parts of the software may be analyzed for extracting abstractions. Said abstractions may be combined with other abstractions and a particular data structure may be created called the signature that may help in recognizing possible abnormal behavior of the software system.

Continuing with the above software system example, the possibility exists that said recognition may in fact be erroneous. Only human professionals may be able to verify with a high degree of certainty that an abnormality in the behavior of said software system has or is occurring. Thus, we may consider encapsulating relevant parts of the event log, other sensor or ICD data pertaining to the situation, possibly using machine learning software, rule sets, etc., and send said data to a panel of human experts who may then engage in an extended transaction sequence with each other to arrive at a conclusion.

The above process may thus be seen as a different kind of abstraction verification and analysis process, one that combines automatic verification and analysis with human-curated verification and analysis.

As a concrete example of a combined human-curated and automatic abstraction verification process, consider FIG. 10B in which a signature object is shown corresponding to a particular execution of a software system (application).

Human-curated verification process starts as follows.

1. Set up a workflow based on a known and pre-determined list of human-curators and systems. It is assumed that interfaces to access said system and query them for participating in the workflow are known (a priori and/or learnt from prior art). New members may be added to the workflow process by existing members while the workflow is in progress.
2. Send the signature object to the first group (one or more) of recipients. Upon completion by said group, the signature object is sent to the next group, etc., until the workflow is completed or aborted (by system command, system policy or human command).
3. During the running of the workflow process, the signature object may be updated. These updates may result from one or more actions such as follows.
   a. One or more members of the workflow may change the application that causes changes to the signature object.
   b. One or members may be added to the workflow who make changes to the application that changes the signature object.
   c. The signature object itself may be modified to capture one or more abstractions as per instructions of one or more members of said workflow.
   d. The running behavior of the system can cause changes to the signature object.
   e. A machine learning system (discussed later) may make changes to the application that cause changes to the signature object.
4. Upon completion of the workflow, save the successively updated versions of the signature object for subsequent use.

The saved versions of the signature object are used in a machine-learning process that learns the various factor values (column values of the various abstractions, e.g., FIG. 10-B). Thus, various values of the factors in a signature may be indicative of abnormal running of the application. When human-curation fixes the abnormality the signature factors return to their "normal" values. There is thus a range of values considered normal for the various signature factors for abstractions and, which may be learnt over time by using a machine-learning process.

Figure 15:
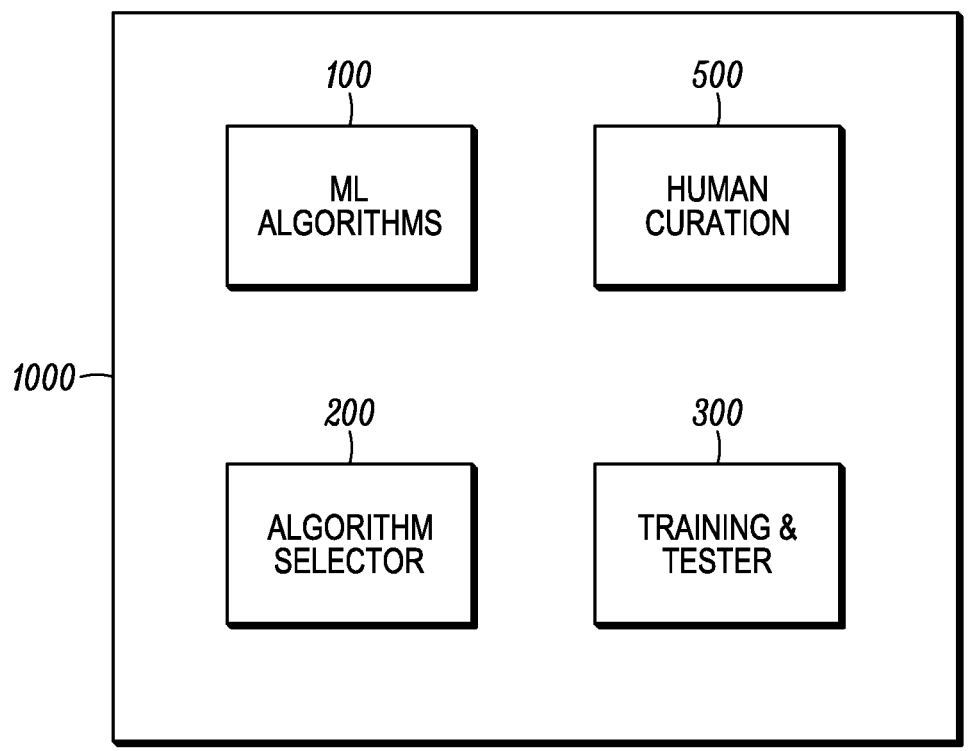
FIG. 15 illustrates the Machine Learning Complex.

FIG. 15 illustrates the various components of the Machine Learning (ML) Complex 1000. The ML Complex contains a Training and Tester complex 300, a human-curation complex 500, a ML algorithms complex, and an Algorithm Selector complex 200.

The Algorithm Complex Selector Complex 200 contains several different ML algorithms that may be chosen by applications to perform the learning function. The Training and Tester 300 may be used to train the learning system on sample data. The Human-Curation complex 500 allows human input to the workflow (as described above).

Illustrative Computing Environment

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 16:
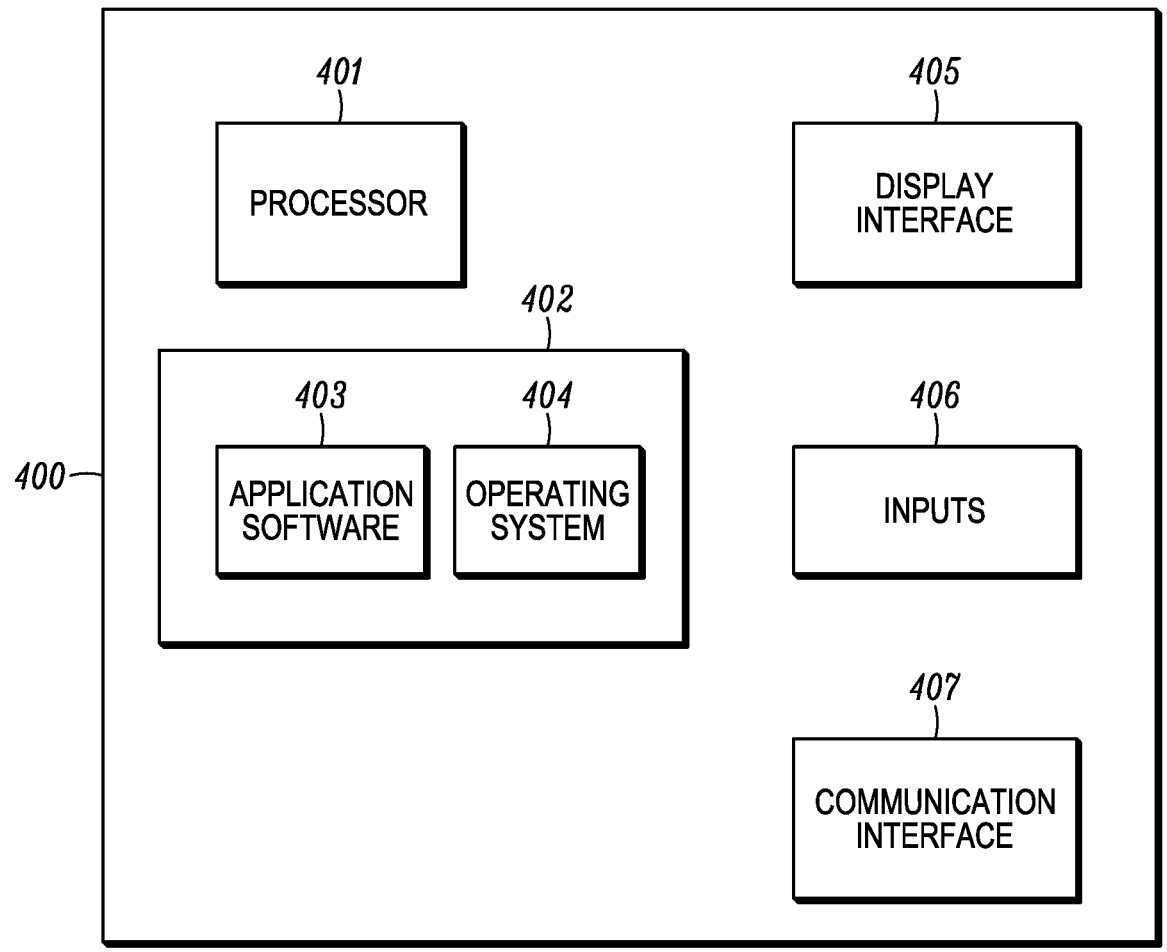
FIG. 16 shows an illustrative computing-based device.

FIG. 16 illustrates various components of an illustrative computing-based device 400 which may be implemented as any form of a computing and/or electronic device, and in which embodiments of various aspects of the present invention as described above may be implemented.

The computing-based device 1000 comprises one or more inputs 1006 which are of any suitable type for receiving media content, Internet Protocol (IP) input, activity tags, activity state information, resources or other input. The device also comprises communication interface 1007 to enable the device to communicate with one or more other entity using any suitable communications medium.

Computing-based device 1000 also comprises one or more processors 1001 that may be microprocessors, controllers or any other suitable type of processors for processing computing executable instructions to control the operation of the device in order to provide a search augmentation system. Platform software comprising an operating system 1004 or any other suitable platform software may be provided at the computing-based device to enable application software 403 to be executed on the device.

The computer executable instructions may be provided using any non-transitory computer-readable media, such as memory 1002. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 1005 is provided to control a display device to be used in conjunction with the computing device. The display system may provide a graphical user interface, or other user interface of any suitable type.

The invention claimed is:

1. A method, comprising:
receiving over one or more communication links a plurality of input data feeds, at least a first of the input data feeds being received from one or more sensors and/or Internet Connected devices (ICDs) located in an environment, the first input data feed including information relating to the environment, the input data feeds including data that is arranged in different formats, wherein the environment includes a set of text-based messages transmitted in accordance with a text-based messaging system over a communications network, the first input data feed including a plurality of messages communicated in accordance with the text-based messaging system;
organizing data in the input data feeds into a plurality of data records that are in a common data record format;
processing each of the data records to obtain at one or more prescribed scales one or more abstractions concerning the environment, each abstraction specifying a change in an information parameter with respect to some other parameter, the information parameter reflecting a characteristic of the environment;
wherein the processing is a function of either the input arrival rate, or a data feed processing rate, or both;
storing the abstractions for subsequent use by one or more applications; and
wherein the text-based messages are assignable to conceptual categories and further comprising comparing words to a database of conceptual categories to identify at least one conceptual category associated with each of the words, wherein organizing the data into the plurality of data records includes organizing each of the words and its associated at least one conceptual category into one of the data records such that the word and its associated at least one conceptual category each define an information parameter included in the respective data record, wherein the abstraction includes a change in one or more of the conceptual categories with which a word is associated.

2. The method of claim 1, wherein the change includes a change in a magnitude and/or direction of the one or more processes.

3. The method of claim 1, wherein the abstraction includes a change in the words associated with a given one of the conceptual categories.

* * * * *